US010977890B2

(12) United States Patent
Zhang et al.

(10) Patent No.: US 10,977,890 B2
(45) Date of Patent: Apr. 13, 2021

(54) SELF-SERVICE PAYMENT DEVICE AND CONTROL METHOD THEREOF

(71) Applicant: Advanced New Technologies Co., Ltd., Grand Cayman (KY)

(72) Inventors: Hong Zhang, Hangzhou (CN); Huanmi Yin, Hanzhou (CN); Li Chen, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 233 days.

(21) Appl. No.: 16/210,959

(22) Filed: Dec. 5, 2018

(65) Prior Publication Data

US 2019/0172296 A1 Jun. 6, 2019

(30) Foreign Application Priority Data

Dec. 6, 2017 (CN) ......................... 201711274037.3

(51) Int. Cl.
*G07G 1/00* (2006.01)
*G07F 11/62* (2006.01)
(Continued)

(52) U.S. Cl.
CPC .............. *G07F 11/62* (2013.01); *G07F 7/088* (2013.01); *G07F 7/0893* (2013.01); *G07F 11/005* (2013.01); *G07G 1/009* (2013.01)

(58) Field of Classification Search
CPC .......... G07F 11/62; G07F 11/46; G07F 17/10; G07F 17/105; G06Q 10/0836; G07G 1/009
(Continued)

(56) References Cited

U.S. PATENT DOCUMENTS 6,669,086 B2 12/2003 Abdi et al.
7,048,184 B2 5/2006 Persky
(Continued)

FOREIGN PATENT DOCUMENTS

CN 105005748 10/2015
CN 105005749 10/2015
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Timothy R Waggoner
(74) *Attorney, Agent, or Firm* — Fish & Richardson P.C.

(57) ABSTRACT

The present specification describes to a self-service payment device and a control method thereof. One example method includes determining that a removable cover plate is in a first state, wherein the removable cover plate and a payment box form an enclosed space when the removable cover plate is in the first state, and the top of the payment box is open when the removable cover plate is in a second state; reading, using at least one radio frequency identification (RFID) antenna fastened to at least one inner wall of the payment box, at least one RFID tag, wherein each RFID tag is associated with a merchandise to be paid inside the payment box; and providing payment information based on the at least one RFID tag.

18 Claims, 20 Drawing Sheets

(51) Int. Cl.
*G07F 7/08* (2006.01)
*G07F 11/00* (2006.01)

(58) Field of Classification Search
USPC ........................................................ 221/192
See application file for complete search history.

(56) References Cited

U.S. PATENT DOCUMENTS

| | | | |
|---|---|---|---|
| 8,397,108 | B1 | 3/2013 | Vannatter et al. |
| 8,896,653 | B2 | 11/2014 | Johnson et al. |
| 2001/0025883 | A1* | 10/2001 | Ichihara .................. G07F 17/12 235/381 |
| 2006/0152339 | A1 | 7/2006 | Mercier et al. |
| 2007/0102511 | A1 | 5/2007 | Park |
| 2008/0041947 | A1 | 2/2008 | Hollister et al. |
| 2008/0088444 | A1 | 4/2008 | Rosebush |
| 2009/0288917 | A1 | 11/2009 | Sato |
| 2010/0013433 | A1* | 1/2010 | Baxter .................... B60L 53/65 320/109 |
| 2012/0102894 | A1 | 5/2012 | TerHaar et al. |
| 2012/0326840 | A1 | 12/2012 | Frankenberg et al. |
| 2012/0330461 | A1 | 12/2012 | Doom |
| 2014/0316561 | A1 | 10/2014 | Tkachenko et al. |
| 2014/0339107 | A1* | 11/2014 | Gelinotte .................. G07F 9/06 206/216 |
| 2015/0029001 | A1 | 1/2015 | Pleshek et al. |
| 2015/0106291 | A1* | 4/2015 | Robinson ........... G06Q 10/0838 705/339 |
| 2015/0302708 | A1 | 10/2015 | Hattori |
| 2016/0223388 | A1* | 8/2016 | Pointeau ............ G01G 19/4144 |
| 2019/0066454 | A1* | 2/2019 | Katayama ................ G07G 1/12 |
| 2020/0231393 | A1* | 7/2020 | Mercado ............... B66B 1/3446 |

FOREIGN PATENT DOCUMENTS

| | | |
|---|---|---|
| CN | 105046842 | 11/2015 |
| CN | 205344991 | 6/2016 |
| CN | 104603850 | 8/2016 |
| CN | 205541115 | 8/2016 |
| CN | 106204240 | 12/2016 |
| CN | 106845965 | 6/2017 |
| CN | 107180499 | 9/2017 |
| CN | 206634041 | 11/2017 |
| EP | 2975551 | 1/2016 |
| WO | WO 2017150226 | 9/2017 |
| WO | WO 2017159275 | 9/2017 |

OTHER PUBLICATIONS

Nakamoto, "Bitcoin: A Peer-to-Peer Electronic Cash System," www.bitcoin.org, 2005, 9 pages.
International Preliminary Report on Patentability in International Application No. PCT/US2018/064342, dated Jan. 31, 2020, 21 pages.
European Extended Search Report in European Appln No. 18884963.2, dated Jun. 23, 2020, 8 pages.
International Search Report and Written Opinion in International Application No. PCT/US2018/064342, dated Feb. 19, 2019, 20 pages.

* cited by examiner

SELF-SERVICE PAYMENT DEVICE AND CONTROL METHOD THEREOF

CROSS-REFERENCE TO RELATED APPLICATIONS

This application claims priority to Chinese Patent Application No. 201711274037.3, filed on Dec. 6, 2017, which is hereby incorporated by reference in its entirety.

TECHNICAL FIELD

A plurality of implementations disclosed in the present specification relate to electronic payment and the field of Internet of Things technologies, and in particular, to a self-service payment device and a control method thereof.

BACKGROUND

With the development of the social economy and the improvement of people's living standards, people shop at stores more frequently. For example, people go to the supermarkets or convenience stores for groceries, clothing stores for clothes, or cosmetics shops for cosmetics.

Currently, cashiers are mainly responsible for collecting payment at the stores. This work is tedious and easy for the cashiers to make mistakes. The labor cost is also quite high. When there are many customers in a store or many items are selected, customers often need to stand in a queue for a longtime to check out. Although vending machines have enabled self-service to some extent, they have limited selling and payment capabilities. They sometimes cannot meet customers' needs for purchasing a variety of times and select different payment methods. Therefore, more efficient methods need to be provided so that customers in a store can conveniently and quickly check out purchased items.

SUMMARY

The present specification describes a self-service payment device and method for quickly and accurately obtain payment information of merchandise by forming electromagnetic shielding space through closing a removable cover of a payment box.

According to a first aspect, a self-service payment device is provided. The device includes the following: a payment box, configured to accommodate a merchandise to be paid, where a removable cover plate is disposed on the payment box, the top of the payment box is open when the removable cover plate is in a first state, the removable cover plate closes so that closed space is formed in the payment box when the removable cover plate is in a second state, and because the removable cover plate and the payment box are made of metal, the closed space forms electromagnetic shielding space; a radio frequency identification (RFID) reading unit, where the RFID reading unit includes an RFID reader and an RFID antenna, the RFID antenna is fastened to an inner wall of the payment box, and the RFID reader reads an RFID tag of the merchandise to be paid by using the RFID antenna; and a controller, configured to control the RFID reading unit to read the RFID tag and obtain payment information based on a reading result.

In a possible design, the device further includes the following: an input unit, where the input unit is connected to the controller. The input unit is configured to receive an operation instruction entered by a user, and the controller is configured to control movement of the removable cover plate based on the operation instruction.

In a possible design, the device further includes the following: a merchandise detection unit, where the merchandise detection unit is connected to the controller, the merchandise detection unit is configured to detect whether a merchandise to be paid exists in the payment box, and the controller is configured to control movement of the removable cover plate based on a detection result.

In a possible design, a lift table is located on the bottom of the payment box, the device further includes a driving mechanism, and the controller is configured to control the driving mechanism to drive the lift table to move vertically in the payment box.

According to a second aspect, a method applied to the self-service payment device according to the first aspect is provided. The method includes the following: determining that the removable cover plate is in a second state; controlling the RFID reader to read an RFID tag of a merchandise to be paid by using the RFID antenna, and obtaining payment information based on the reading result; obtaining payment characteristics information corresponding to the payment information of a user; and determining that the removable cover plate is in a first state.

In a possible implementation, the device further includes the input unit, and the determining that the removable cover plate is in a second state includes the following: receiving an operation instruction entered by the user by using the input unit; and controlling the removable cover plate to move to the second state based on the operation instruction.

In a possible implementation, the device further includes the merchandise detection unit, where before it is determined that the removable cover plate is in the second state, the method further includes the following: detecting, by using the merchandise detection unit, whether a merchandise to be paid exists in the payment box; and the determining that the removable cover plate is in a second state includes the following: controlling the removable cover plate to move to the second state when it is detected that the merchandise to be paid exists in the payment box and does not change in a first threshold time.

The self-service payment device and the method are provided in the present specification: the removable cover plate closes so that electromagnetic shielding space is formed in the payment box, and the RFID antenna is disposed on the inner wall of the payment box, so the controller can control the RFID reader to completely, quickly, and accurately read the RFID tag of the merchandise to be paid in the payment box by using the RFID antenna and provide the payment information based on the reading result.

BRIEF DESCRIPTION OF DRAWINGS

To describe the technical solutions in a plurality of implementations disclosed in the present specification, the following briefly describes the accompanying drawings for describing the implementations. Apparently, the accompanying drawings in the following description show merely a plurality of implementations disclosed in the present specification, and a person of ordinary skill in the art can still derive other drawings from these accompanying drawings without creative efforts.

DESCRIPTION OF EMBODIMENTS

The following describes a plurality of implementations disclosed in the present specification with reference to the accompanying drawings.

Figure 1A:
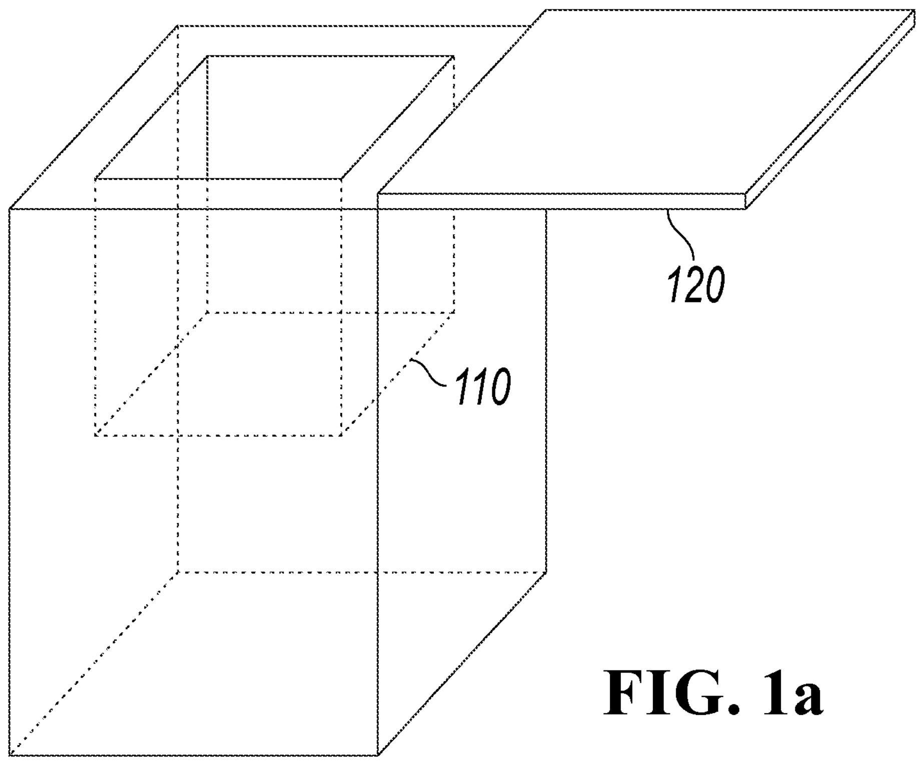
FIG. 1*a* is a diagram of an external structure of a self-service payment device, according to an implementation disclosed in the present specification.
Figure 1B:
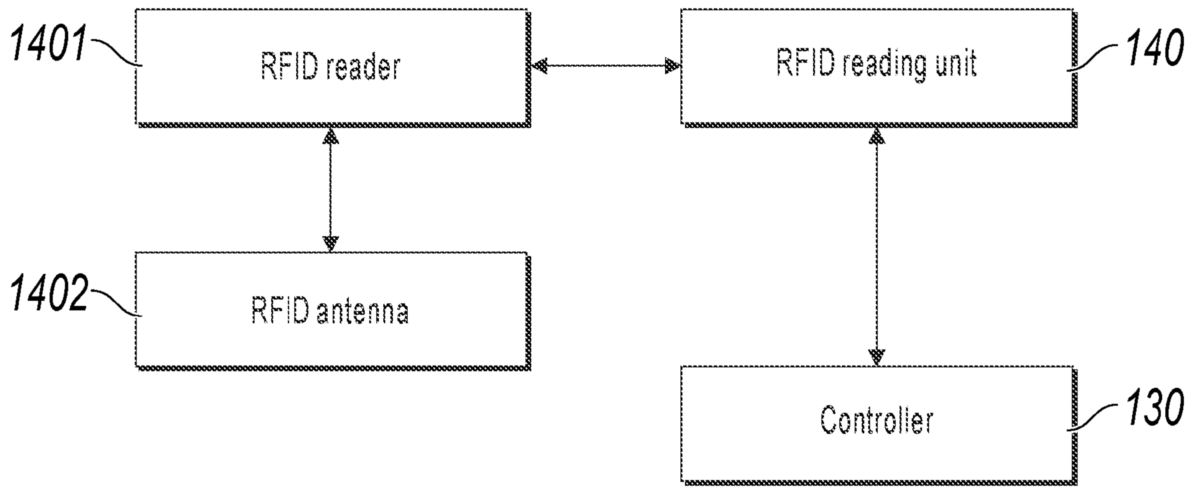
FIG. 1*b* is a diagram of a control structure of a self-service payment device, according to an implementation disclosed in the present specification.

FIG. 1*a* is a diagram of an external structure of a self-service payment device, according to an implementation disclosed in the present specification. FIG. 1*b* is a diagram of a control structure of a self-service payment device, according to an implementation disclosed in the present specification. In an implementation, the self-service payment device has the external structure shown in FIG. 1*a* and the control structure shown in FIG. 1*b*. The device can include a payment box 110 configured to accommodate a merchandise to be paid and a removable cover plate 120 disposed on the payment box 110 shown in FIG. 1*a*, and a controller 130 and a radio frequency identification (RFID) reading unit 140 shown in FIG. 1*b*. The controller 130 and the RFID reading unit 140 in FIG. 1*b* are not shown in FIG. 1*a*.

Figure 2:
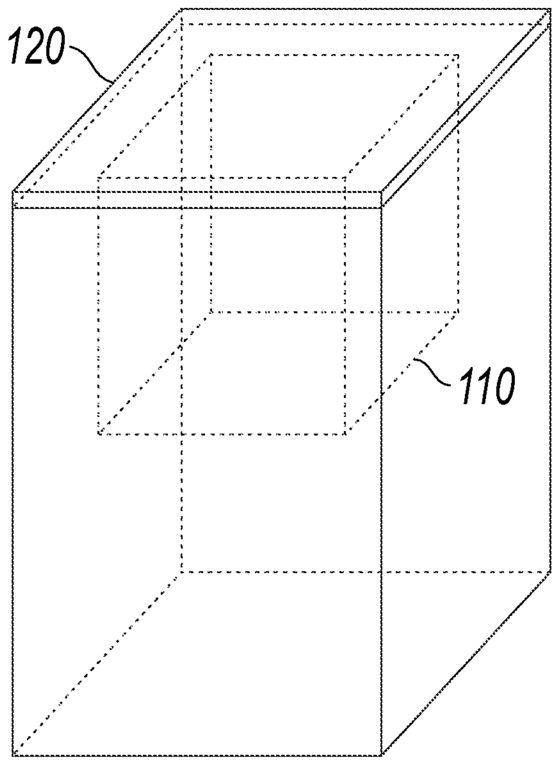
FIG. 2 is a diagram of an external structure of a self-service payment device, according to another implementation disclosed in the present specification.

The top of the payment box 110 is open when the removable cover plate 120 is in a first state (for example, the state shown in FIG. 1*a*), and the removable cover plate 120 closes so that closed space is formed in the payment box 110 when the removable cover plate 120 is in a second state (for example, the state shown in FIG. 2). Because the removable cover plate 120 and the payment box 110 are made of metal, the closed space forms electromagnetic shielding space.

The RFID reading unit 140 includes an RFID reader 1401 and an RFID antenna 1402. The RFID antenna 1402 is fastened to at least one inner wall of the payment box 110, and the RFID reader 1401 reads an RFID tag of the merchandise to be paid by using the RFID antenna 1402. The RFID antenna 1402 can be a circularly polarized antenna, and inner walls of the payment box 110 include a bottom wall and four side walls. The RFID antenna 1402 can be fastened to any one or more of the bottom wall and the four side walls of the payment box 110.

The controller 130 is configured to control the RFID reading unit 140 to read the RFID tag and provide payment information based on a reading result. In such case, the removable cover plate 120 closes so that electromagnetic shielding space is formed in the payment box 110, thereby effectively preventing the RFID reading unit from reading an RFID outside of the payment box 110.

Figure 3:
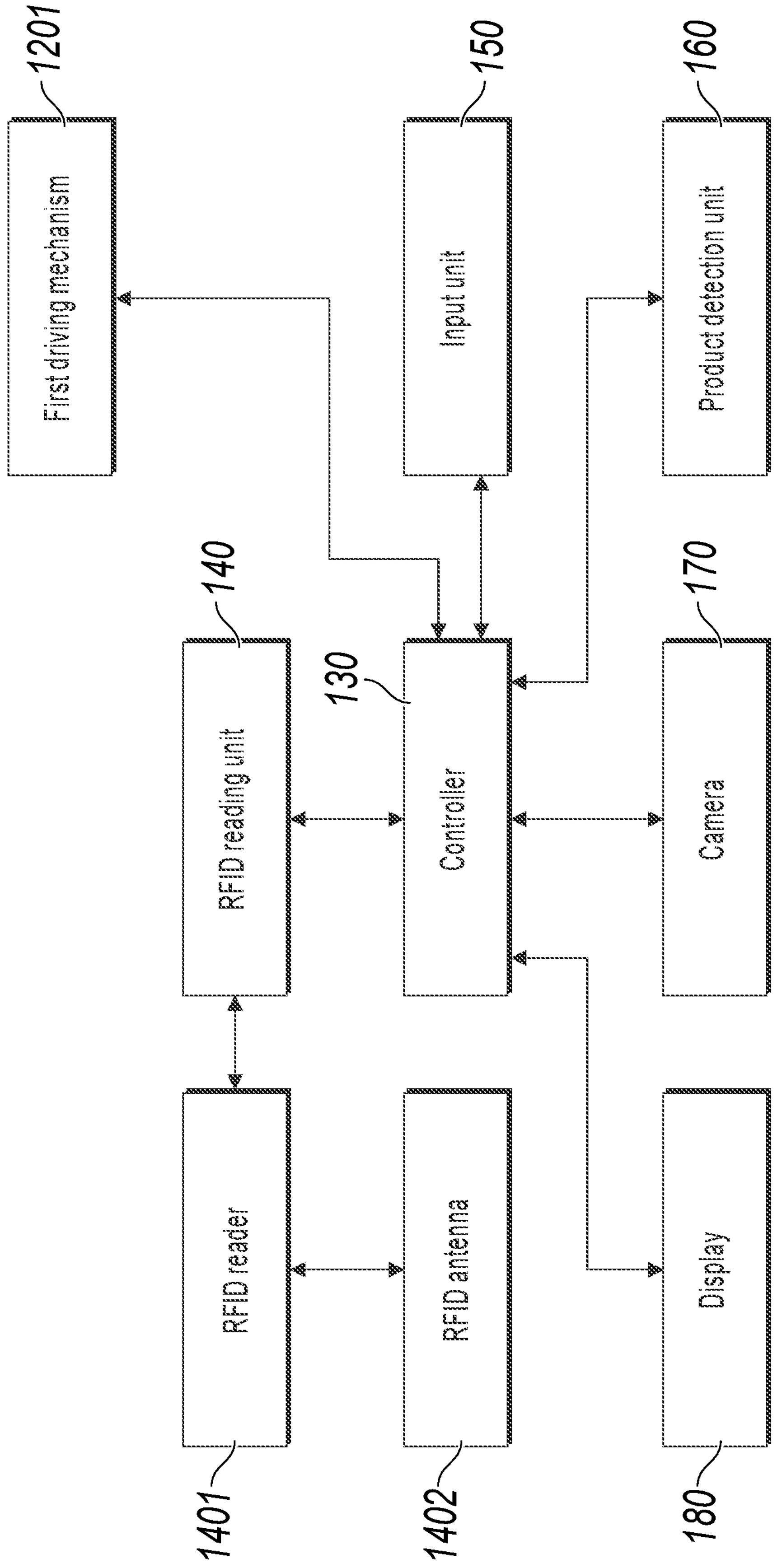
FIG. 3 is a diagram of a control structure of a self-service payment device, according to still another implementation disclosed in the present specification.

For example, as shown in FIG. 3, the device can also include an input unit 150 and a first driving mechanism 1201. The input unit 150 is connected to the controller 130, and can be configured to receive an operation instruction entered by a user. The operation instruction of the user can include moving (opening or closing) the removable cover plate 120. The controller 130 can control the first driving mechanism 1201 to drive the removable cover plate 120 to move based on the operation instruction received by the input unit 150. The input unit 150 can include an entity button, or can include a touch-control device.

For another example, as shown in FIG. 3, the device can also include a merchandise detection unit 160 and a first driving mechanism 1201. The merchandise detection unit 160 is connected to the controller 130, and can be configured to detect whether a merchandise to be paid exists in the payment box 110. The controller 130 can be configured to control the first driving mechanism 1201 to drive the removable cover plate to move based on an operation instruction.

Figure 4:
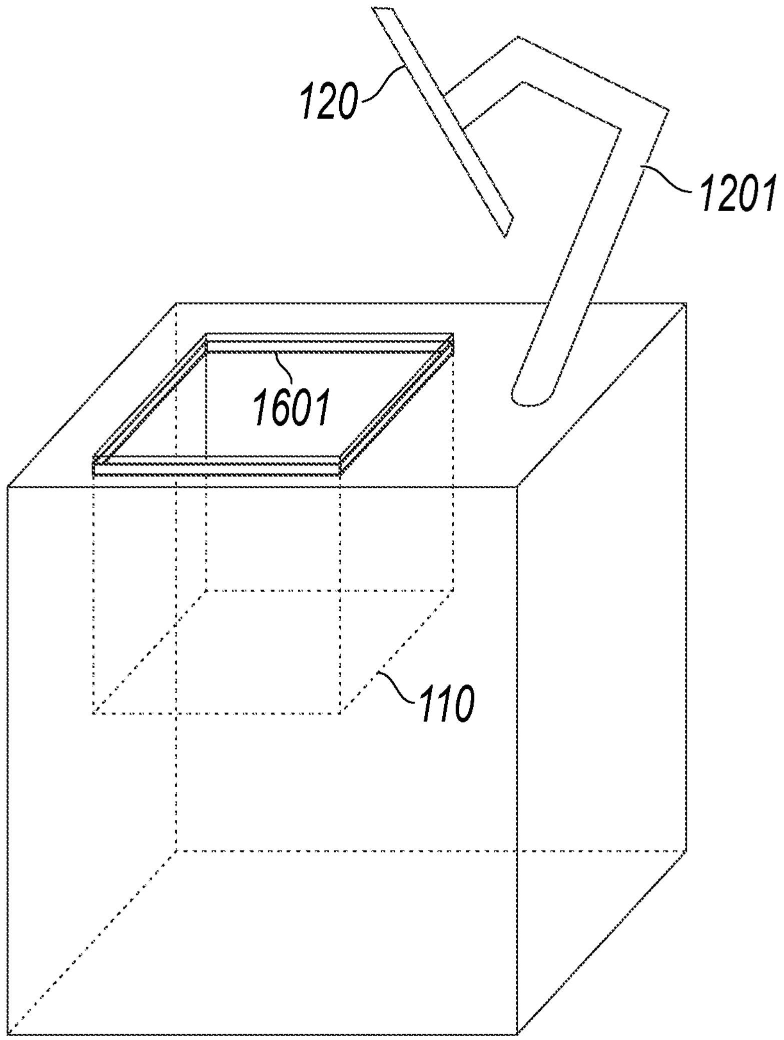
FIG. 4 is a diagram of an external structure of a self-service payment device, according to yet another implementation disclosed in the present specification.

For example, as shown in FIG. 4, the merchandise detection unit includes an infrared detection frame 1601. The infrared detection frame 1601 includes a plurality of infrared transmitters and receivers. The transmitters are configured to transmit infrared rays, and the receivers are configured to receive infrared rays sent by corresponding transmitters. When a merchandise is moved into the payment box, infrared rays are blocked, and consequently some receivers cannot receive corresponding infrared rays. As such, it can be detected whether a merchandise is moved into the payment box through the blocking status of infrared rays. For example, the infrared detection frame 1601 is disposed at the opening of the payment box 110. Alternatively, the infrared detection frame can be disposed at another position, such as the bottom of the payment box 110.

For another example, the merchandise detection unit includes a pressure sensor, and the pressure sensor is disposed on the bottom of the payment box 110.

For another example, as shown in FIG. 3, the device can also include a camera 170. The camera 170 is connected to the controller 130, and can be configured to capture identification information of a user. The controller 130 can send the identification information captured by the camera 170 to a server. The identification information can include the user's identity documents, face information, fingerprint information, QR code identification information, etc.

For yet another example, as shown in FIG. 3, the device can also include a display 180. The display 180 is connected to the controller 130, and can be configured to display the payment information obtained by the controller 130.

It is worthwhile to note that the removable cover plate 120 in the plurality of implementations disclosed in the present specification can be a complete plate or can include at least two foldable plates, and a protection plate of the removable cover plate 120 can be disposed on the payment box to protect the removable cover plate 120. The first driving mechanism 1201 used to drive the removable cover plate 120 can be implemented in a plurality of mechanical structures. For example, the first driving mechanism is a mechanical arm shown in FIG. 4, so the removable cover plate 120 can move with the mechanical arm to open or close the payment box 110. For another example, the first driving mechanism includes a motor and a slide rail, so the removable cover plate can slide along the slide rail driven by the motor, to open or close the payment box. Implementations are not limited in the plurality of implementations disclosed in the present specification.

In addition, the removable cover plate 120 and the payment box 110 can be made of copper, aluminum, steel, etc., and the four side walls of the payment box 110 can be made of different materials. For example, the removable cover plate can be a steel plate. For another example, the three side walls of the payment box 110 are metal plates, and the remaining side wall is made of two glass plates and a wire mesh sandwiched between the two glass plates. As such, a user can observe status of a merchandise in the payment box through the side wall.

The self-service payment device is provided in the plurality of implementations disclosed in the present specification. The removable cover plate closes so that electromagnetic shielding space can be formed in the payment box, and the RFID antenna is disposed on the inner wall of the payment box, so the controller can control the RFID reader to completely, quickly, and accurately read the RFID tag of the merchandise to be paid in the payment box by using the RFID antenna, and provide the payment information based on the reading result. Further, the controller can send the identification information captured by the camera to the server, so the server can search for corresponding account information of the user based on the identification information, to complete payment based on the account information and the payment information, thereby improving speed of paying for the merchandise to be paid and improving user experience.

Figure 5A:
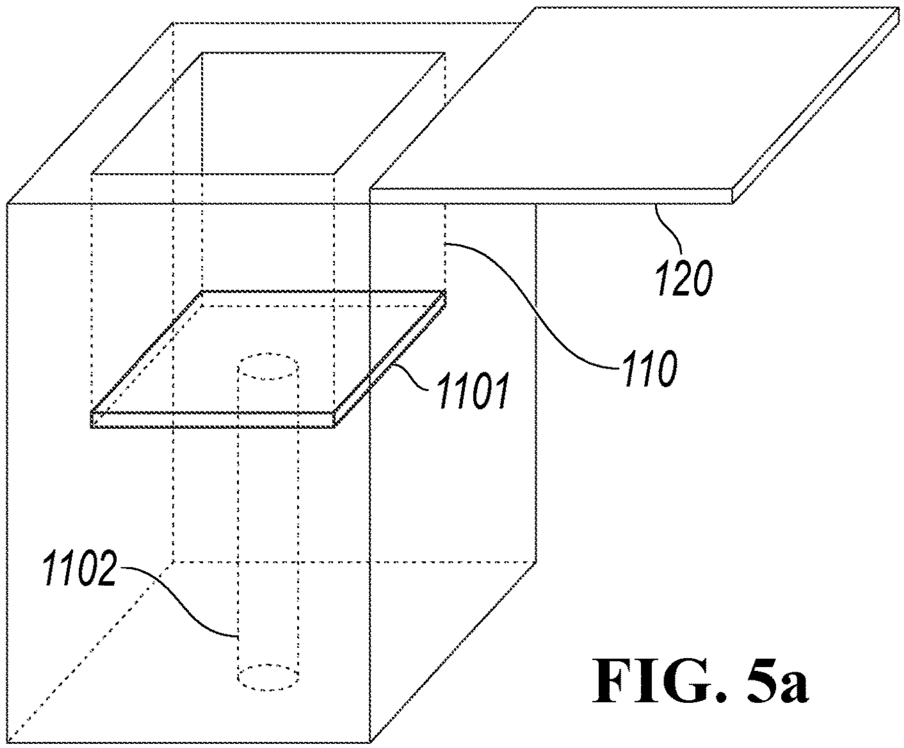
FIG. 5*a* is a diagram of an external structure of a self-service payment device, according to an implementation disclosed in the present specification.
Figure 5B:
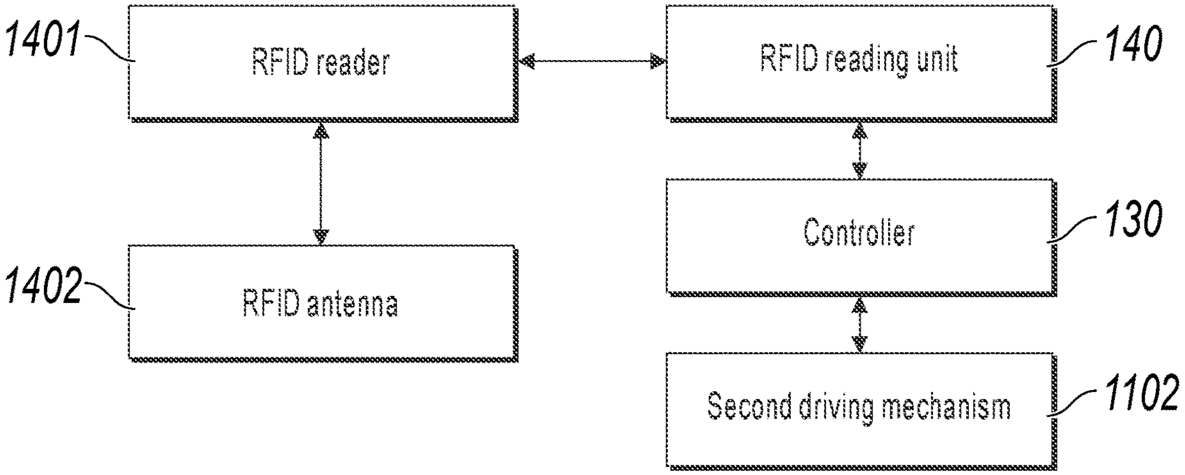
FIG. 5*b* is a diagram of a control structure of a self-service payment device, according to an implementation disclosed in the present specification.

FIG. 5*a* is a diagram of an external structure of a self-service payment device, according to an implementation disclosed in the present specification. FIG. 5*b* is a diagram of a control structure of a self-service payment device, according to an implementation disclosed in the present specification. In the present implementation, the self-service payment device has the external structure shown in FIG. 5*a* and the control structure shown in FIG. 5*b*. The device can include a payment box 110 configured to accommodate a merchandise to be paid and a removable cover plate 120 disposed on the payment box 110 shown in FIG. 5*a*, and a controller 130 and an RFID reading unit 140 shown in FIG. 5*b*. The controller 130 and the RFID reading unit 140 in FIG. 5*b* are not shown in FIG. 5*a*.

As shown in FIG. 5*a*, in the present implementation, a lift table 1101 is disposed on the bottom of the payment box 110. The device further includes a second driving mechanism 1102, and the controller 130 is configured to control the second driving mechanism 1102 to drive the lift table 1101 to move vertically in the payment box 110.

Figure 6:
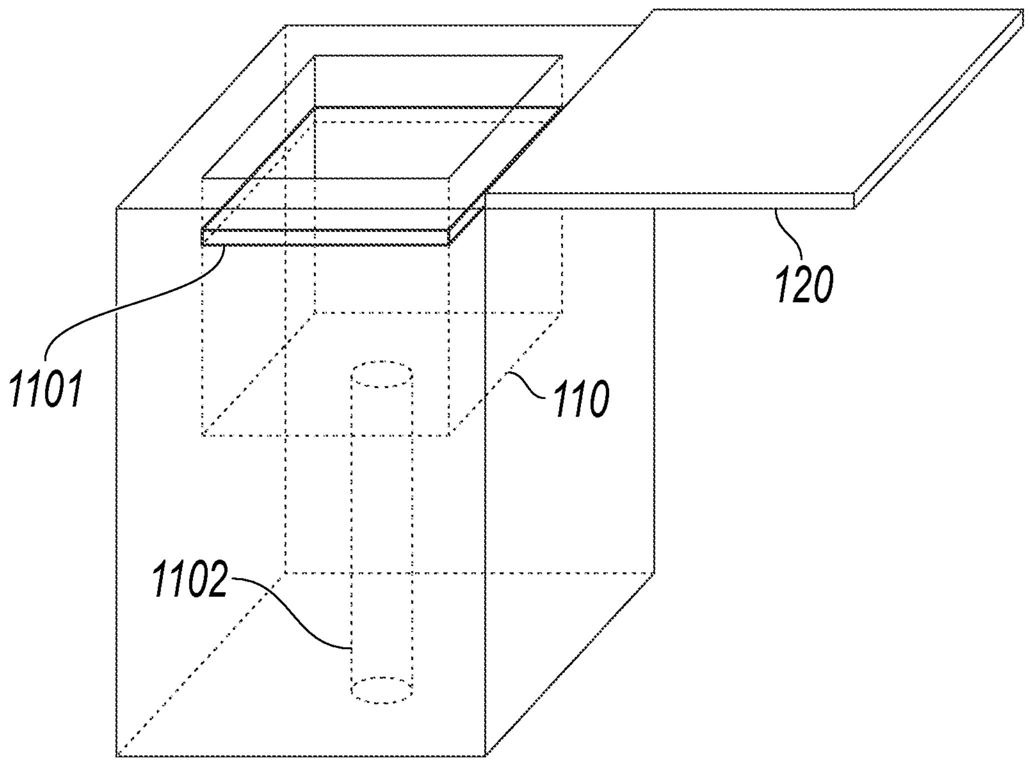
FIG. 6 is a diagram of an external structure of a self-service payment device, according to another implementation disclosed in the present specification.

For example, an initial position of the lift table 1101 is shown in FIG. 6, and the controller 130 can control the second driving mechanism 1102 to drive the lift table 1101 to move vertically in the payment box 110 to the position shown in FIG. 5*a*.

The second driving mechanism 1102 can be implemented in a plurality of mechanical structures. For example, a hydraulic system can be used to drive the lift table up and down. For another example, an electric motor, a screw lever, a linear bearing, etc. can be used to drive the lift table up and down.

Figure 7:
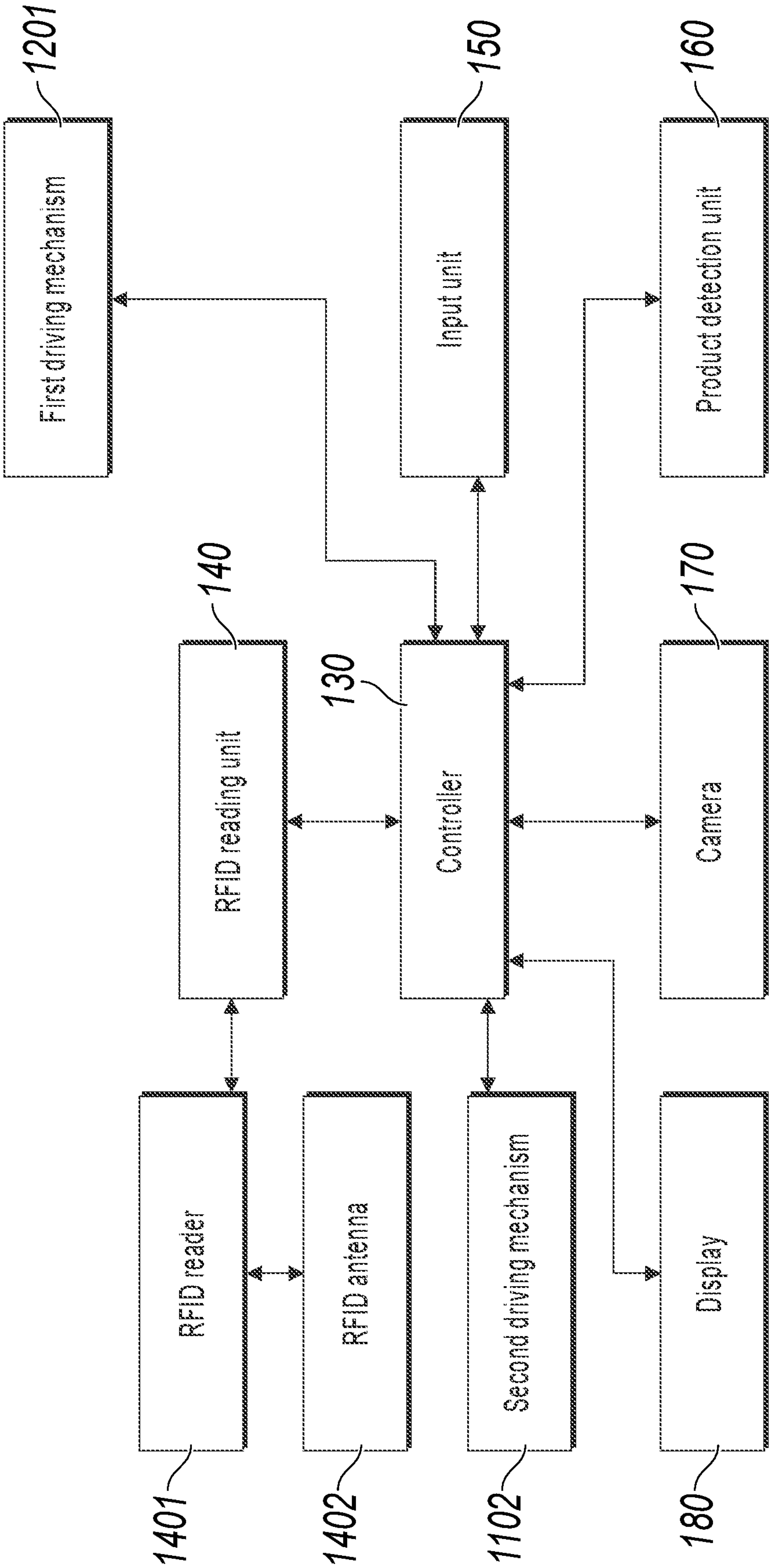
FIG. 7 is a diagram of a control structure of a self-service payment device, according to still another implementation disclosed in the present specification.

For another example, the device can also include an input unit 150 shown in FIG. 7. The input unit 150 is connected to the controller 130, and can be configured to receive an operation instruction entered by a user. The operation instruction can include opening/closing the removable cover plate 120 and raising/lowering the lift table 1101. Correspondingly, the controller 130 can control movement of the lift table 1101 and the removable cover plate 120 based on the operation instruction received by the input unit 150.

Figure 8:
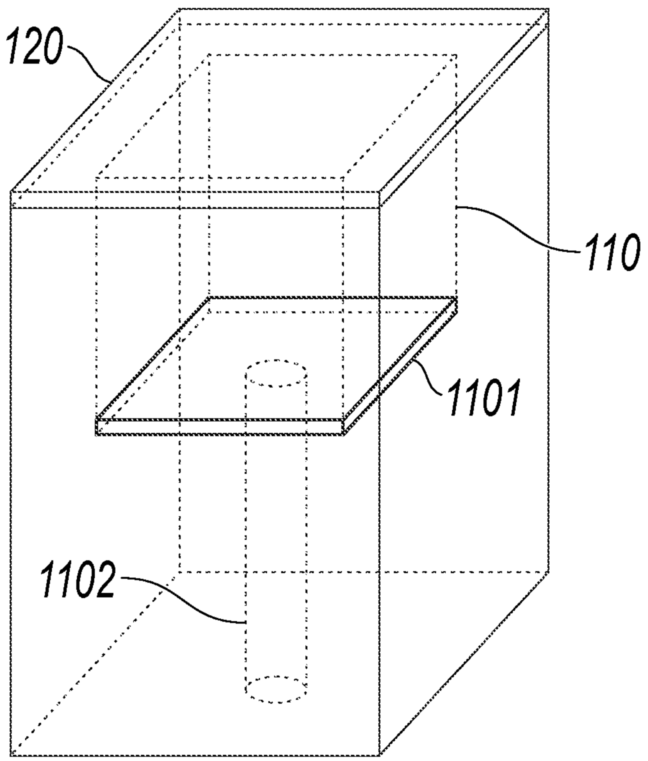
FIG. 8 is a diagram of an external structure of a self-service payment device, according to yet another implementation disclosed in the present specification.

For example, as shown in FIG. 6 and FIG. 8, the controller 130 can control the lift table 1101 to move vertically from the height in FIG. 6 to the height in FIG. 8, and control the removable cover plate 120 to move from the state in FIG. 6 to the state in FIG. 8, based on the operation instruction received by the input unit 150.

For another example, as shown in FIG. 7, the device can also include a merchandise detection unit 160. The merchandise detection unit 160 is connected to the controller 130, and can be configured to detect whether a merchandise to be paid exists on the lift table 1101. The controller can be configured to control movement of the lift table 1101 and the removable cover plate 120 based on a detection result.

For another example, as shown in FIG. 7, the device can also include a camera 170.

For yet another example, as shown in FIG. 7, the device can also include a display 180.

It is worthwhile to note that for descriptions of the payment box 110 and the removable cover plate 120 in FIG. 5*a*, the RFID reading unit 140 and the controller 130 in FIG. 5*b*, and the first driving mechanism 1201, the input unit 150, the merchandise detection unit 160, the camera 170, and the display 180 in FIG. 7, references can be made to descriptions of the payment box 110 and the removable cover plate 120 in FIG. 1*a*, the RFID reading unit 140 and the controller 130 in FIG. 1*b*, and the first driving mechanism 1201, the input unit 150, the merchandise detection unit 160, the camera 170, and the display 180 in FIG. 3 in the previous implementation.

The self-service payment device is provided in the plurality of implementations disclosed in the present specification. The removable cover plate closes so that electromagnetic shielding space can be formed in the payment box, and the RFID antenna is disposed on the inner wall of the payment box, so the controller can control the RFID reader to completely, quickly, and accurately read the RFID tag of the merchandise to be paid in the payment box by using the RFID antenna, and provide the payment information based on the reading result. Further, the controller can send the identification information captured by the camera to the server, so the server can search for corresponding account information of the user based on the identification information, to complete payment based on the account information and the payment information, thereby improving speed of paying for the merchandise to be paid. In addition, the lift table is disposed on the bottom of the payment box, and the controller controls rise and fall of the lift table in the payment box. As such, the user can pick and place selected merchandises to further improve user experience.

Corresponding to the previous self-service payment device, a plurality of implementations disclosed in the present specification further provide a self-service payment method.

Figure 9:
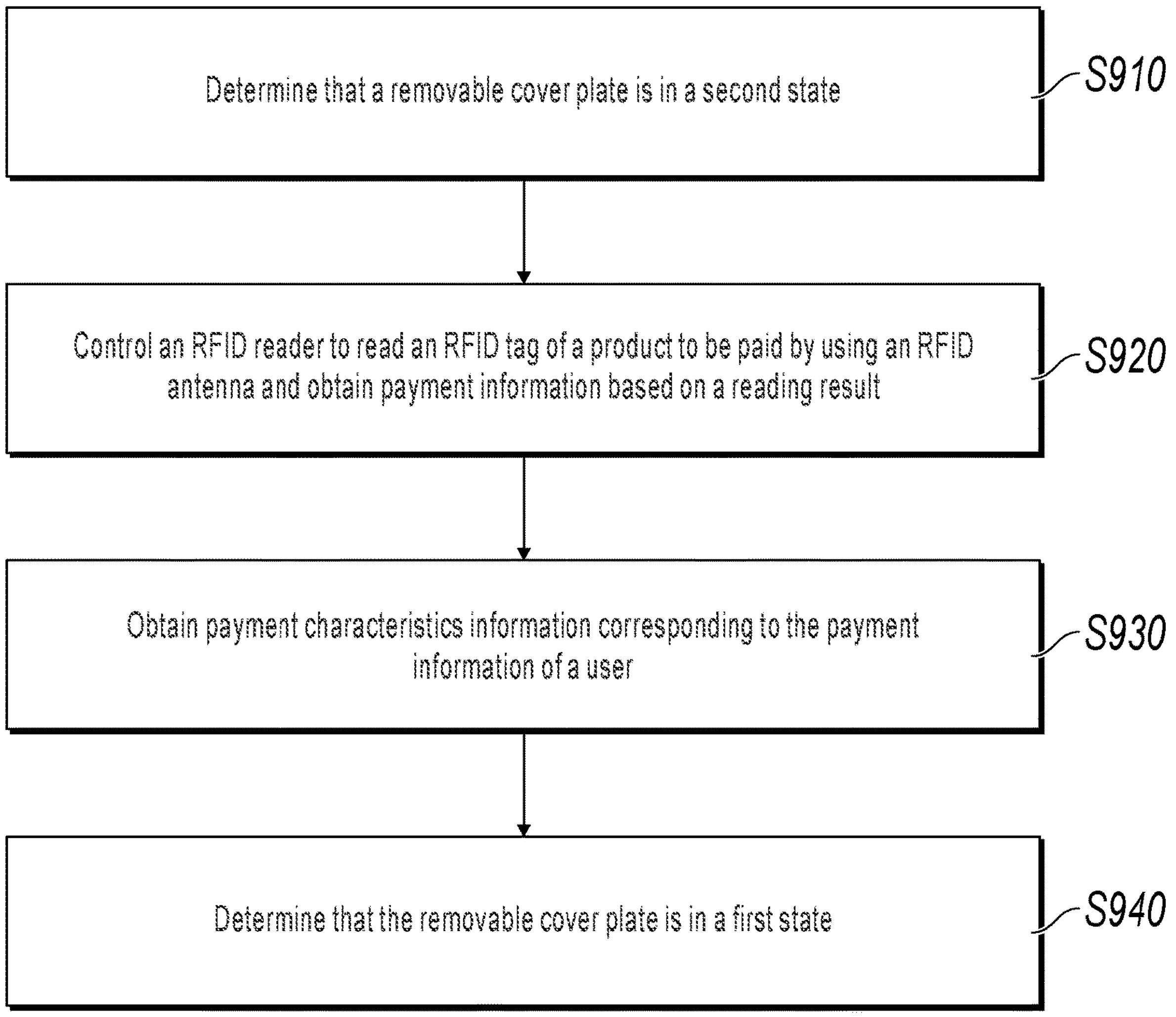
FIG. 9 is a flowchart of a self-service payment method, according to an implementation disclosed in the present specification.

FIG. 9 is a flowchart of a self-service payment method, according to an implementation disclosed in the present specification. The method can be executed by a device that has a processing capability, that is, a controller, a server, or a system, for example, the controller in FIG. 1*b*.

The self-service payment method provided in an implementation disclosed in the present specification is applied to the self-service payment device provided in the previous implementation. The device can include the payment box 110 configured to accommodate a merchandise to be paid and the removable cover plate 120 disposed on the payment box 110 shown in FIG. 1*a*, the controller 130 and the RFID reading unit 140 shown in FIG. 1*b*.

As shown in FIG. 9, the method includes the following steps.

Step S910: Determine that the removable cover plate is in a second state.

As described above, the top of the payment box is open when the removable cover plate is in a first state. In such case, the user can place a merchandise to be paid into the payment box. The removable cover plate closes so that electromagnetic shielding space is formed in the payment box when the removable cover plate is in the second state.

In the present step, after the user places the merchandise to be paid into the payment box, it is determined that the removable cover plate moves from the first state to the second state.

Moving the removable cover plate from the first state to the second state can include the following: moving, by the user, the removable cover plate from the first state to the second state; or controlling, by the controller, the removable cover plate to move from the first state to the second state based on an instruction entered by the user; or controlling, by the controller, the removable cover plate to move from the first state to the second state based on a result of detecting a merchandise to be paid.

Figure 10:
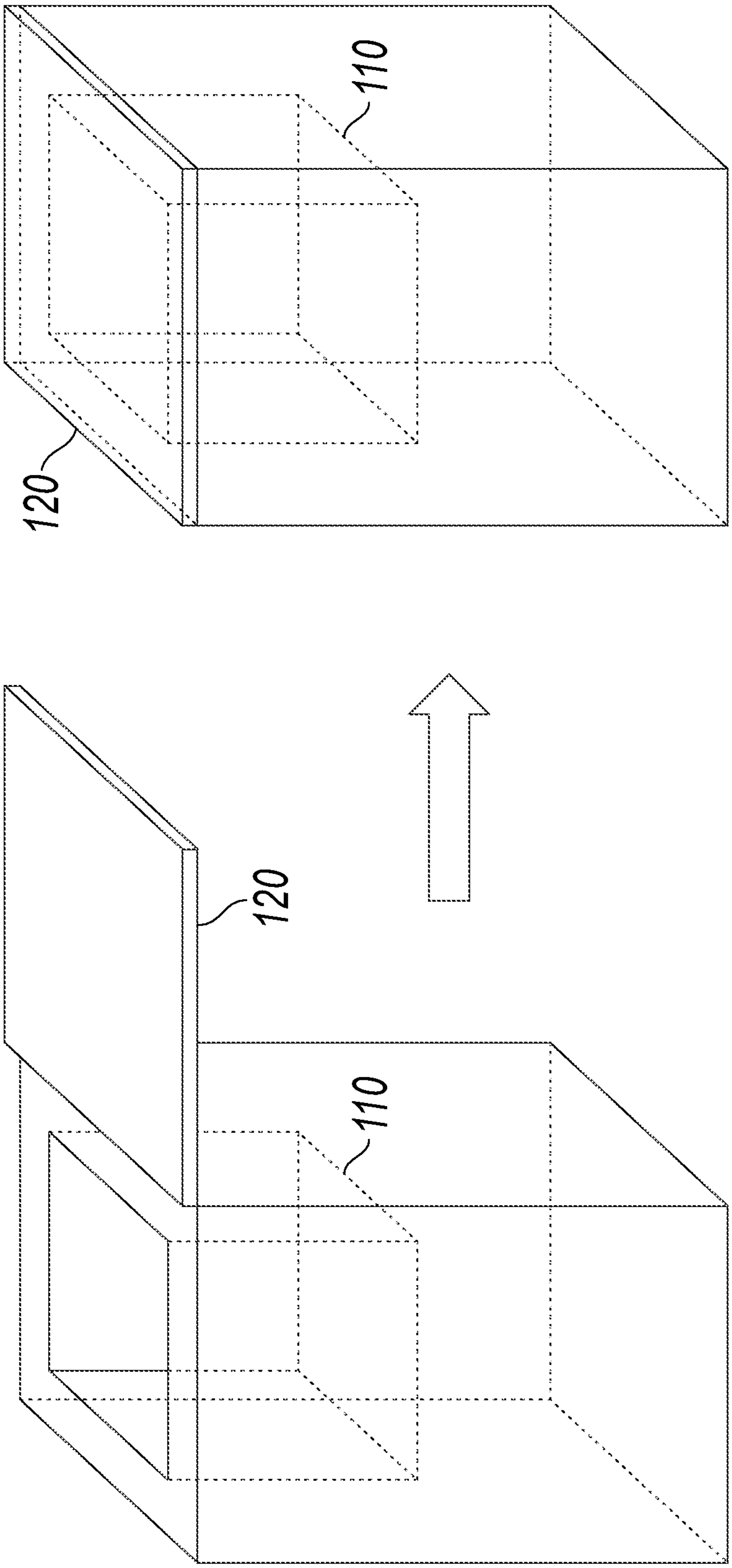
FIG. 10 is a diagram of a usage state of a self-service payment device, according to an implementation disclosed in the present specification.

For example, as shown in FIG. 10, the top of the payment box is open when the removable cover plate 120 is in a first state. After placing merchandise to be paid into the payment box, the user pushes or pulls the removable cover plate 120 to the second state. As such, the payment box 110 is closed to form electromagnetic shielding space. When a user manually operates the removable cover plate, the controller can detect light intensity in the payment box by using a light sensor, to determine that the removable cover plate is in the second state that the payment box is closed, or the controller can determine that the removable cover plate is in the second state based on a state of a locking mechanism between the removable cover plate and the payment box.

For another example, the self-service payment device can also include the input unit and the first driving mechanism shown in FIG. 3. As shown in FIG. 10, the top of the payment box is open when the removable cover plate 120 is in a first state. After placing merchandise to be paid into the payment box, the user enters an operation instruction by using the input unit. The operation instruction can include moving the removable cover plate to close the payment box. The controller controls the removable cover plate 120 to move to the second state based on the operation instruction. As such, the payment box 110 is closed to form electromagnetic shielding space.

For example, the input unit can include an entity button. Correspondingly, after placing merchandise to be paid into the payment box, the user enters an operation instruction by pressing the entity button. The controller controls the removable cover plate 120 to move to the second state based on the operation instruction. As such, the payment box 110 is closed to form electromagnetic shielding space.

For another example, the input unit includes a touch-control device. Correspondingly, after placing merchandise to be paid into the payment box, the user enters an operation instruction by pressing a virtual key in the touch-control device. The controller controls the removable cover plate 120 to move to the second state based on the operation instruction. As such, the payment box 110 is closed to form electromagnetic shielding space.

For another example, the self-service payment device further includes the merchandise detection unit and the first driving mechanism shown in FIG. 3. As shown in FIG. 10, the top of the payment box is open when the removable cover plate 120 is in a first state. The controller detects, by using the merchandise detection unit, whether a merchandise to be paid exists in the payment box. When it is detected that the merchandise to be paid exists in the payment box and does not change in a first threshold time, the controller controls the removable cover plate 120 to move to the second state based on the detection result. As such, the payment box 110 is closed to form electromagnetic shielding space.

Figure 11:
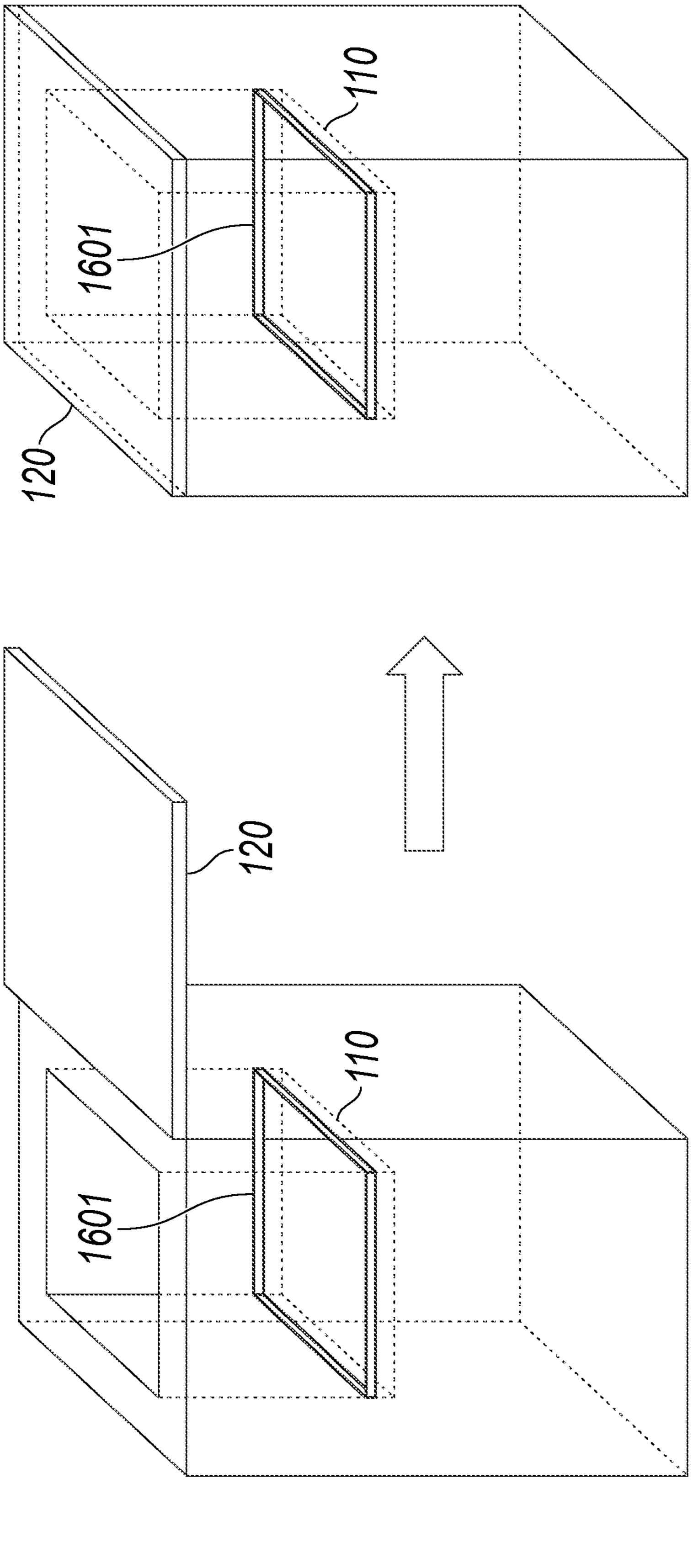
FIG. 11 is a diagram of a usage state of a self-service payment device, according to another implementation disclosed in the present specification.

For example, as shown in FIG. 11, the merchandise detection unit includes an infrared detection frame 1601, and the infrared detection frame is disposed on the bottom of the payment box. When the controller detects, by using the infrared detection frame, that a merchandise to be paid is moved into the payment box and no merchandise is moved into or moved out of the payment box in the first threshold time (for example, the first threshold can be 1 s), the controller controls the first driving mechanism to drive the removable cover plate 120 to move to the second state based on the detection result. As such, the payment box 110 is closed to form electromagnetic shielding space.

For another example, the merchandise detection unit includes a pressure sensor, and the pressure sensor is disposed on the bottom of the payment box. When the controller detects, by using the pressure sensor, that a merchandise to be paid exists in the payment box and a pressure change (for example, the pressure change is 0.05 N) detected in the first threshold time (for example, the first threshold time can be 1.5 s) is less than a pressure change threshold (for example, the pressure change threshold is 0.1 N), the controller controls the first driving mechanism to drive the removable cover plate 120 to move to the second state based on the detection result. As such, the payment box 110 is closed to form electromagnetic shielding space.

Step S920: Control an RFID reader to read an RFID tag of a merchandise to be paid by using an RFID antenna and provide payment information based on the reading result.

In the present step, the payment information can include names of merchandise to be paid, the number and a unit price of each of the merchandise to be paid, a total amount of the merchandise to be paid, available payment methods (for example, by using the ALIPAY application), etc.

After determining that the removable cover plate is in the second state, that is, the removable cover plate and the payment box form electromagnetic shielding space, the controller controls the RFID reader to read the RFID tag of the merchandise to be paid by using the RFID antenna and provides the payment information based on the reading result.

Providing payment information based on a reading result can include the following: obtaining, by the controller, the payment information based on the reading result, and providing the payment information to the user.

For example, the controller provides payment information based on a reading result, including the following: obtaining, by the controller, the payment information from a local server based on the reading result, or sending, by the controller, the reading result to a cloud server so that the cloud server generates payment information based on the reading result.

For example, the controller is connected to the local server. The controller controls the RFID reader to read the RFID tag of the merchandise to be paid by using the RFID antenna, and obtains the payment information from the local server based on the reading result.

For example, the controller is connected to the cloud server. The controller controls the RFID reader to read the RFID tag of the merchandise to be paid by using the RFID antenna, and sends the reading result to the cloud server so that the cloud server generates payment information based on the reading result.

For another example, the controller provides the payment information for the user, including the following: presenting, by the controller, the payment information to the user. As such, the user can pay for the merchandise to be paid based on the payment information.

For example, the self-service payment device further includes the display shown in FIG. 3, and the display is connected to the controller. After obtaining the payment information based on the reading result, the controller controls the display to display the payment information to be confirmed by the user.

For another example, the user logs in to an application by using a mobile device, and enters a number of the current self-service payment device into the application to receive the payment information sent by the controller.

Step S930: Obtain payment characteristics information corresponding to the payment information of a user.

In the present step, the payment characteristics information can include identification information of the user. The identification information can include the user's identity documents, face information, fingerprint information, QR code identification information, payment methods, transaction amount, etc.

For example, after confirming that the payment information is correct, the user can open a payment application on the mobile phone (for example, the payment application is the ALIPAY application), and scan a money collection QR code displayed on the display to complete payment transaction. In such case, the payment information includes payment methods and a transaction amount.

For another example, after confirming that the payment information is correct, the user puts cash through a cash slot to complete payment transaction. In such case, the payment information includes a cash amount determined by a cash counting device, a desired change amount, etc.

For yet another example, the self-service payment device can also include a Near Field Communication (Near Field Communication, NFC for short) sensing device. After confirming that the payment information is correct, the user places a terminal device supporting the NFC function in the proximity of a sensing interface of the NFC sensing device to complete payment transaction. In such case, the payment information includes information about an NFC chip carried in the NFC terminal device.

For yet another example, the self-service payment device further includes the camera shown in FIG. 3, and the camera is connected to the controller. The camera can capture identification information of a user, for example, ID card information, iris information, or face information, and send the identification information to the cloud server, so the cloud server can search for user account information corresponding to the identification information, to complete payment of a merchandise to be paid based on the user account information and the payment information.

For yet another example, the self-service payment device can also include a fingerprint recognition device. The fingerprint recognition device can scan and recognize fingerprint information, and send the information to the cloud server, so the cloud server can search for user account information corresponding to the identification information to complete payment of a merchandise to be paid based on the user account information and the payment information.

Step S940: Determine that the removable cover plate is in a first state.

In the present step, the top of the payment box is open when the removable cover plate is in the first state. In such case, the user can retrieve a merchandise from the payment box.

The removable cover plate closes so that closed space is formed in the payment box when the removable cover plate is in the second state. After the user pays successfully, the removable cover plate moves from the second state to the first state.

Moving the removable cover plate from the second state to the first state can include the following: moving, by the user, the removable cover plate from the second state to the first state, or controlling, by the controller, the removable cover plate to move from the second state to the first state based on a payment result for a merchandise to be paid by the user.

Figure 12:
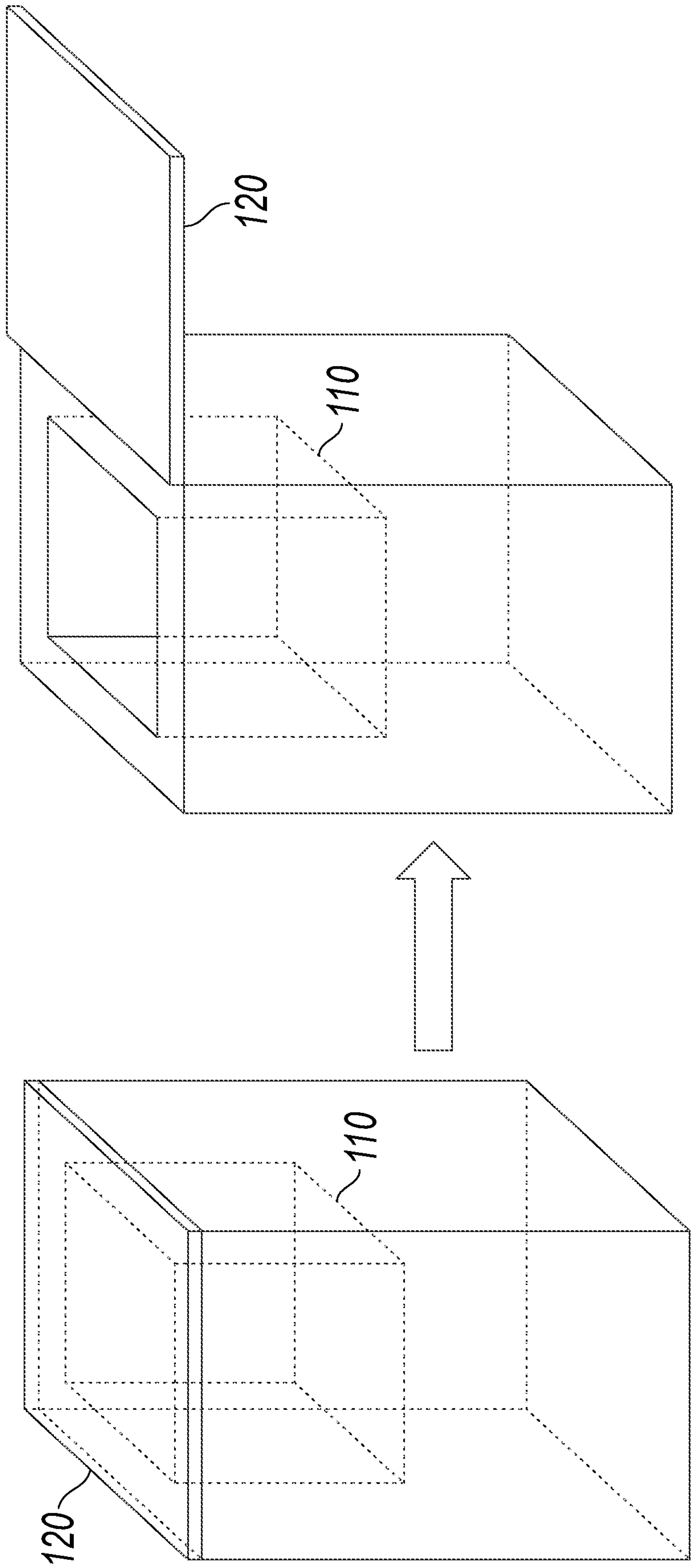
FIG. 12 is a diagram of a usage state of a self-service payment device, according to still another implementation disclosed in the present specification.

For example, as shown in FIG. 12, the removable cover plate 120 closes so that closed space is formed in the payment box 110 when the removable cover plate 120 is in the second state. After determining the payment succeeds, the user pushes or pulls the removable cover plate 120 to the first state so that the top of the payment box 110 is open. As such, the user can retrieve a merchandise from the payment box 110. When a user manually operates the removable cover plate, corresponding to step S910, determining that the removable cover plate is in a first state includes the following: detecting, by the controller, light intensity in the payment box by using a light sensor, to determine that the removable cover plate is in the first state that the payment box is open, or determining, by the controller, that the removable cover plate is in the first state based on a state of a locking mechanism between the removable cover plate and the payment box. For another example, the self-service payment device further includes the input unit and the first driving mechanism shown in FIG. 3. Correspondingly, after determining that the payment succeeds, the user can enter an operation instruction by using the input unit. The operation instruction can include moving the removable cover plate to open the payment box. The controller controls the first driving mechanism to drive the removable cover plate 120 to the first state based on the operation instruction so that the top of the payment box 110 is open. As such, the user can retrieve a merchandise from the payment box 110.

For another example, the controller controls the removable cover plate 120 to move to the first state based on a payment result for a merchandise to be paid by the user in step S930, so that the top of the payment box 110 is open. As such, the user can retrieve a merchandise from the payment box 110.

The self-service payment method is provided in the plurality of implementations disclosed in the present specification. After it is determined that the removable cover plate closes so that electromagnetic shielding space is formed in the payment box, the RFID reader can be controlled to completely, quickly, and accurately read the RFID tag of the merchandise to be paid in the payment box by using the RFID antenna, and the payment information is obtained based on the reading result. Further, the identification information captured by the camera can be sent to the cloud server, so the cloud server can search for corresponding account information of the user based on the identification information, to complete payment based on the account information and the payment information, thereby improving speed of paying for the merchandise to be paid.

Figure 13:
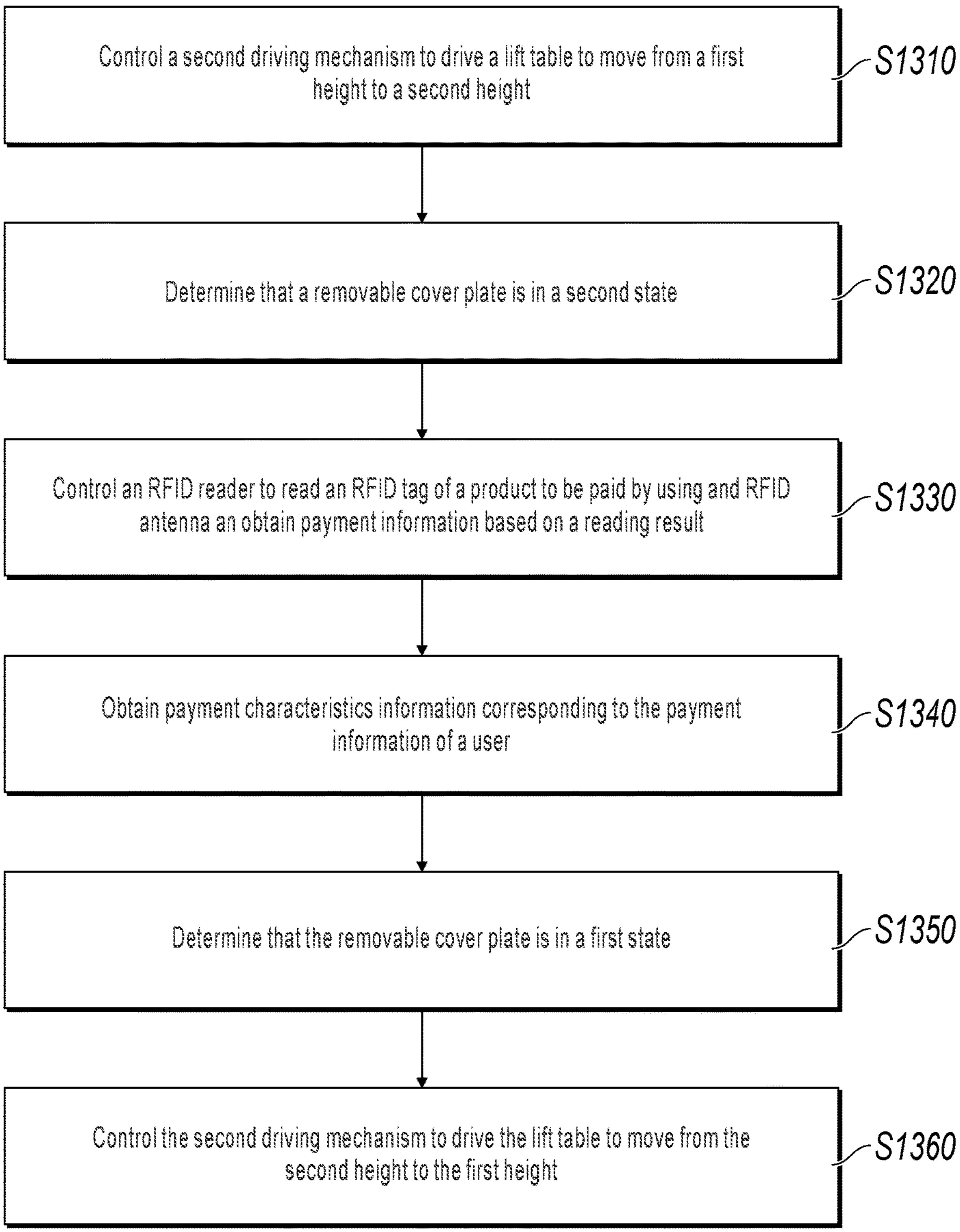
FIG. 13 is a flowchart of a self-service payment method, according to another implementation disclosed in the present specification.

FIG. 13 is a flowchart of a self-service payment method, according to an implementation disclosed in the present specification. The method can be executed by a device that has a processing capability, that is, a controller, a server, or a system, for example, the controller in FIG. 5*b*.

The self-service payment method provided in an implementation disclosed in the present specification is applied to the self-service payment device provided in the previous implementation. The device can include the payment box 110 configured to accommodate a merchandise to be paid and the removable cover plate 120 disposed on the payment box 110 shown in FIG. 5*a*, and the controller 130 and the RFID reading unit 140 shown in FIG. 5*b*.

In the present implementation, a lift table 1101 is disposed on the bottom of the payment box 110. The device further includes a second driving mechanism 1102, and the controller 130 is configured to control the second driving mechanism 1102 to drive the lift table 1101 to move vertically in the payment box 110.

As shown in FIG. 13, the method includes the following steps.

Step S1310: Control the second driving mechanism to move the lift table from a first height to a second height, where the first height is higher than the second height, that is, in comparison with the first height, the lift table is farther from an opening of the payment box when being located at the second height.

The lift table is initially located at the first height so that the user can place a merchandise to be paid on the table. After the user places the merchandise to be paid on the lift table, the controller controls the second driving mechanism to drive the lift table to move from the first height to the second height, that is, lower the lift table to the second height.

The controller controls the second driving mechanism to drive the lift table to move from the first height to the second height, including the following: controlling, by the controller, the second driving mechanism to drive the lift table to move from the first height to the second height based on an instruction entered by the user; or controlling, by the controller, the second driving mechanism to drive the lift table to move from the first height to the second height based on a result of detecting the merchandise to be paid.

Figure 14:
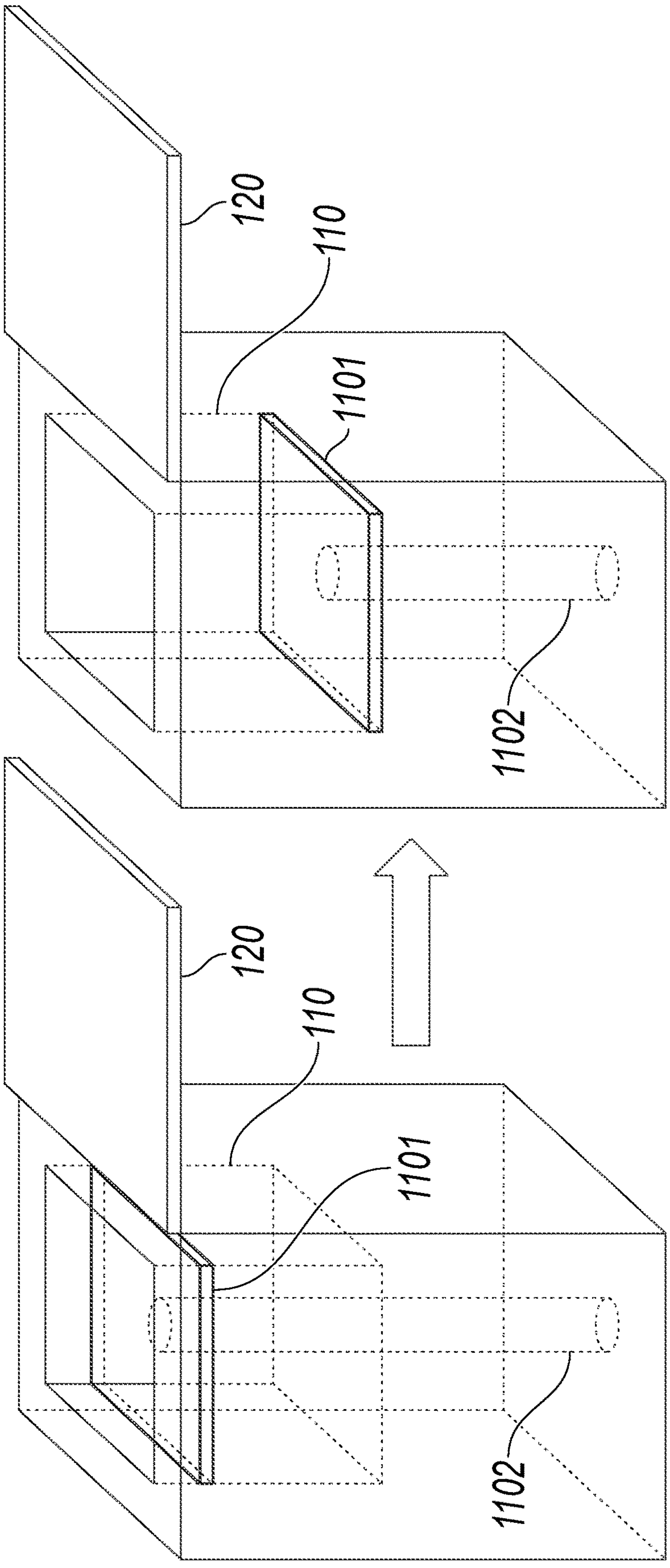
FIG. 14 is a diagram of a usage state of a self-service payment device, according to an implementation disclosed in the present specification.

For example, the self-service payment device can also include the input unit shown in FIG. 7. As shown in FIG. 14, the lift table 1101 is located at the first height, and after placing the merchandise to be paid on the lift table 1101, the user can enter an operation instruction by using the input unit. The operation instruction can include an instruction to move the lift table 1101. The controller controls the second driving mechanism 1102 to drive the lift table 1101 to move to the second height based on the operation instruction.

Alternatively, after placing merchandise to be paid on the lift table 1101, the user enters a first operation instruction by using the input unit. The first operation instruction includes an instruction to lower the lift table. The controller controls the second driving mechanism 1102 to drive the lift table 1101 to move downwards vertically based on the first operation instruction. When the lift table 1101 moves downwards vertically to the second height, the user enters a second operation instruction by using the input unit. The second operation instruction includes an instruction to stop moving the lift table. The controller controls the second driving mechanism 1102 to stop driving the lift table 1101 to move vertically based on the second operation instruction.

For example, the input unit can include an entity button. As shown in FIG. 14, the lift table 1101 is located at the first height. After placing a merchandise to be paid on the lift table 1101, the user presses the entity button to enter an operation instruction, and the controller controls the second driving mechanism 1102 to drive the lift table 1101 to move downwards vertically to the second height based on the operation instruction.

For another example, the input unit includes a touch-control device. As shown in FIG. 14, the lift table 1101 is located at the first height. After placing a merchandise to be paid on the lift table 1101, the user taps a virtual key in the touch-control device to enter an operation instruction, and the controller controls the second driving mechanism 1102 to drive the lift table 1101 to move downwards vertically to the second height based on the operation instruction.

For another example, the self-service payment device further includes the merchandise detection unit shown in FIG. 7. The controller can detect, by using the merchandise detection unit, whether a merchandise to be paid exists on the lift table 1101. When it is detected that the merchandise to be paid exists on the lift table 1101 and does not change in a second threshold time, the second driving mechanism 1102 is controlled to drive the lift table 1101 to move to the second height.

Figure 15:
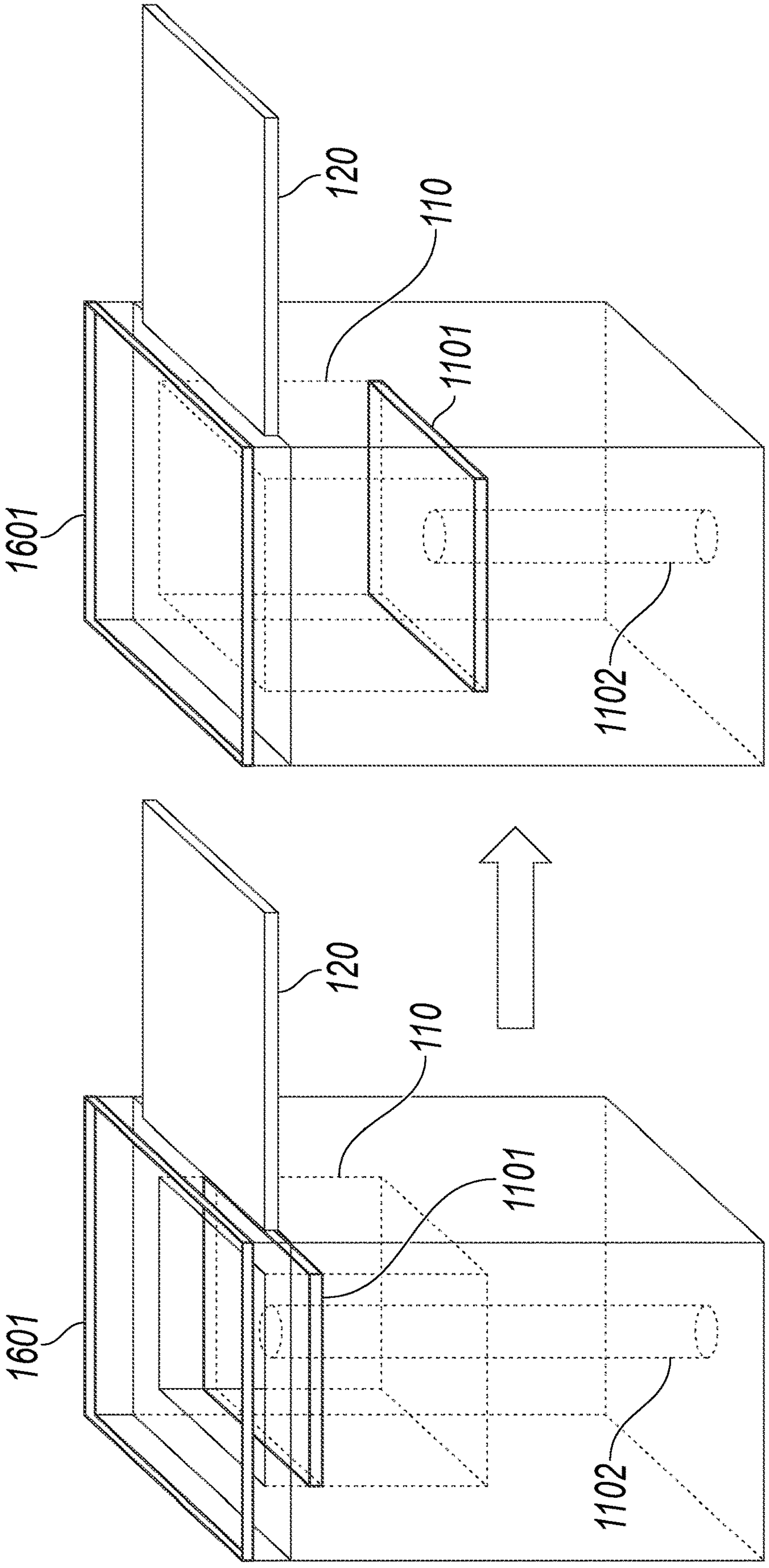
FIG. 15 is a diagram of a usage state of a self-service payment device, according to another implementation disclosed in the present specification.
Figure 16:
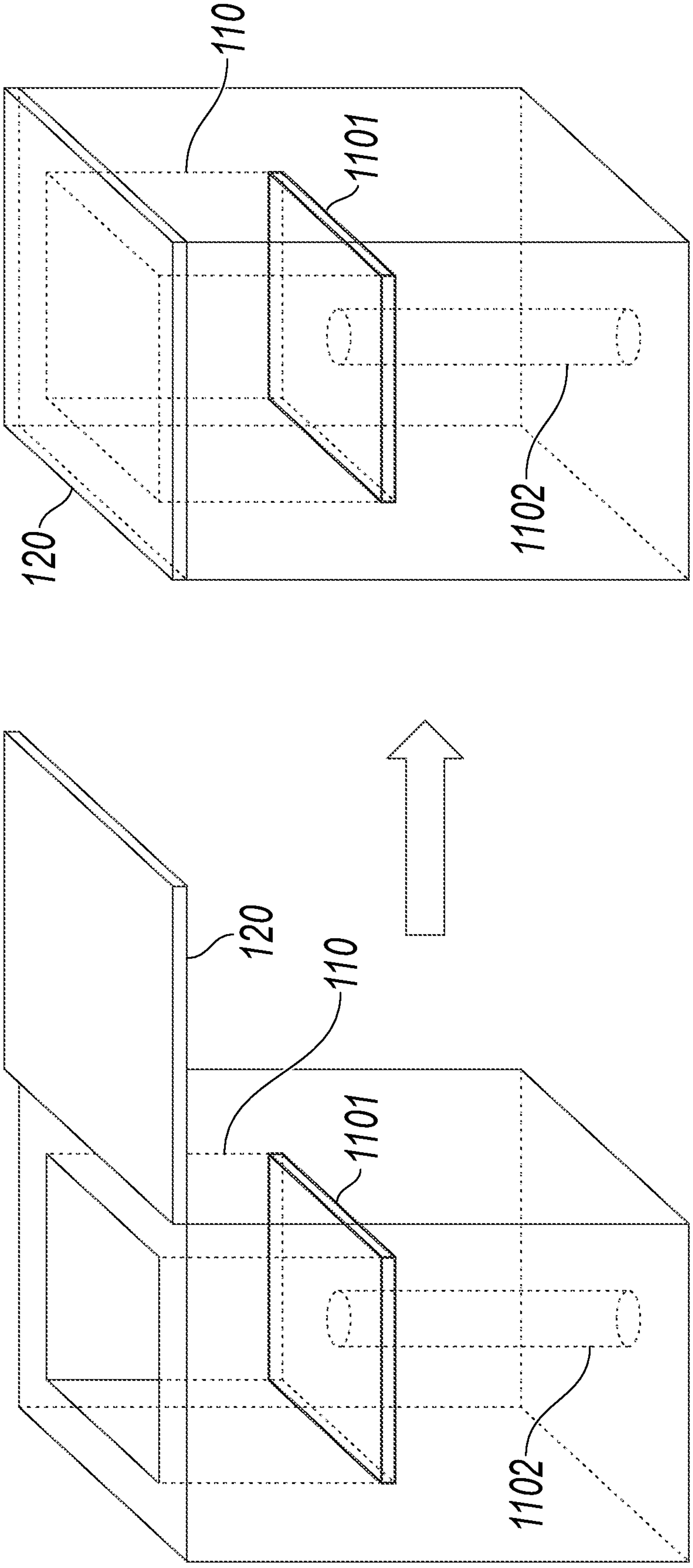
FIG. 16 is a diagram of a usage state of a self-service payment device, according to still another implementation disclosed in the present specification.

For example, as shown in FIG. 15, the merchandise detection unit includes an infrared detection frame 1601, and the infrared detection frame is disposed on the periphery of the opening of the payment box. The lift table 1101 is located at the first height. When the controller detects, by using the infrared detection frame, that the merchandise to be paid exists on the lift table 1101, and no new merchandise is placed on the lift table 1101 or no new merchandise is retrieved from the lift table 1101 in the second threshold time (for example, the second threshold time can be 1 s), the second driving mechanism 1102 is controlled to drive the lift table 1101 to move to the second height.

In a process that the second driving mechanism 1102 is controlled to drive the lift table 1101 to fall vertically, if the controller detects, by using the infrared detection frame 1601, that a merchandise is placed on the lift table, the second driving mechanism 1102 can be controlled to stop driving the lift table 1101. When no new merchandise is detected in a third threshold time (for example, the third threshold time can be 1.5 s), the second driving mechanism 1102 continues to be controlled to drive the lift table 1101 to move to the second height.

For another example, the merchandise detection unit includes a pressure sensor, and the pressure sensor is disposed on the lift table 1101. As shown in FIG. 14, the lift table 1101 is located at the first height. When the controller detects, by using the pressure sensor, that the merchandise to be paid exists on the lift table 1101 and a pressure change (for example, the pressure change is 0.05 N) detected in the second threshold time (for example, the second threshold time can be 1.5 s) is less than a pressure change threshold (for example, the pressure change threshold is 0.1 N), the second driving mechanism 1102 is controlled to drive the lift table 1101 to move to the second height.

Step S1320: Determine that the removable cover plate is in a second state.

As described above, the top of the payment box is open when the removable cover plate is in a first state. In such case, the user can place a merchandise into the payment box, and more specifically on the lift table. Afterwards, the lift table is lowered to the second height. After the lift table is lowered to the second height, the user needs to determine that the removable cover plate moves to the second state. As such, the payment box is closed to form electromagnetic shielding space.

The removable cover plate moves from the first state to the second state, including the following: moving, by the user, the removable cover plate from the first state to the second state; or controlling, by the controller, the removable cover plate to move from the first state to the second state based on an instruction entered by the user; or automatically triggering, by the controller, a first driving mechanism to drive the removable cover plate to move from the first state to the second state after controlling the second driving mechanism to drive the lift table to move from the first height to the second height.

For example, after the controller controls the second driving mechanism 1102 to drive the lift table 1101 to move from the first height to the second height, the user pushes or pulls the removable cover plate 120 to the second state. As such, the payment box 110 is closed to form electromagnetic shielding space.

For another example, the self-service payment device can also include the input unit and the first driving mechanism shown in FIG. 7. After the controller controls the second driving mechanism 1102 to drive the lift table 1101 to move from the first height to the second height, the user enters an operation instruction by using the input unit. The operation instruction includes an instruction to close the removable cover plate. Then, the controller controls the first driving mechanism to drive the removable cover plate 120 to move to the second state based on the operation instruction. As such, the payment box 110 is closed to form electromagnetic shielding space.

For example, the input unit can include an entity button. Correspondingly, after the lift table 1101 moves from the first height to the second height, the user enters an operation instruction by pressing the entity button. The controller controls the removable cover plate 120 to move to the second state based on the operation instruction. As such, the payment box 110 is closed to form electromagnetic shielding space.

For another example, the input unit includes a touch-control device. After the lift table 1101 moves from the first height to the second height, the user enters an operation instruction by pressing a virtual key in the touch-control device. The controller controls the removable cover plate 120 to move to the second state based on the operation instruction. As such, the payment box 110 is closed to form electromagnetic shielding space.

For another example, after determining that the lift table 1101 moves from the first height to the second height, the controller automatically triggers the first driving mechanism to drive the removable cover plate 120 to move to the second state. As such, the payment box 110 is closed to form electromagnetic shielding space.

Figure 17:
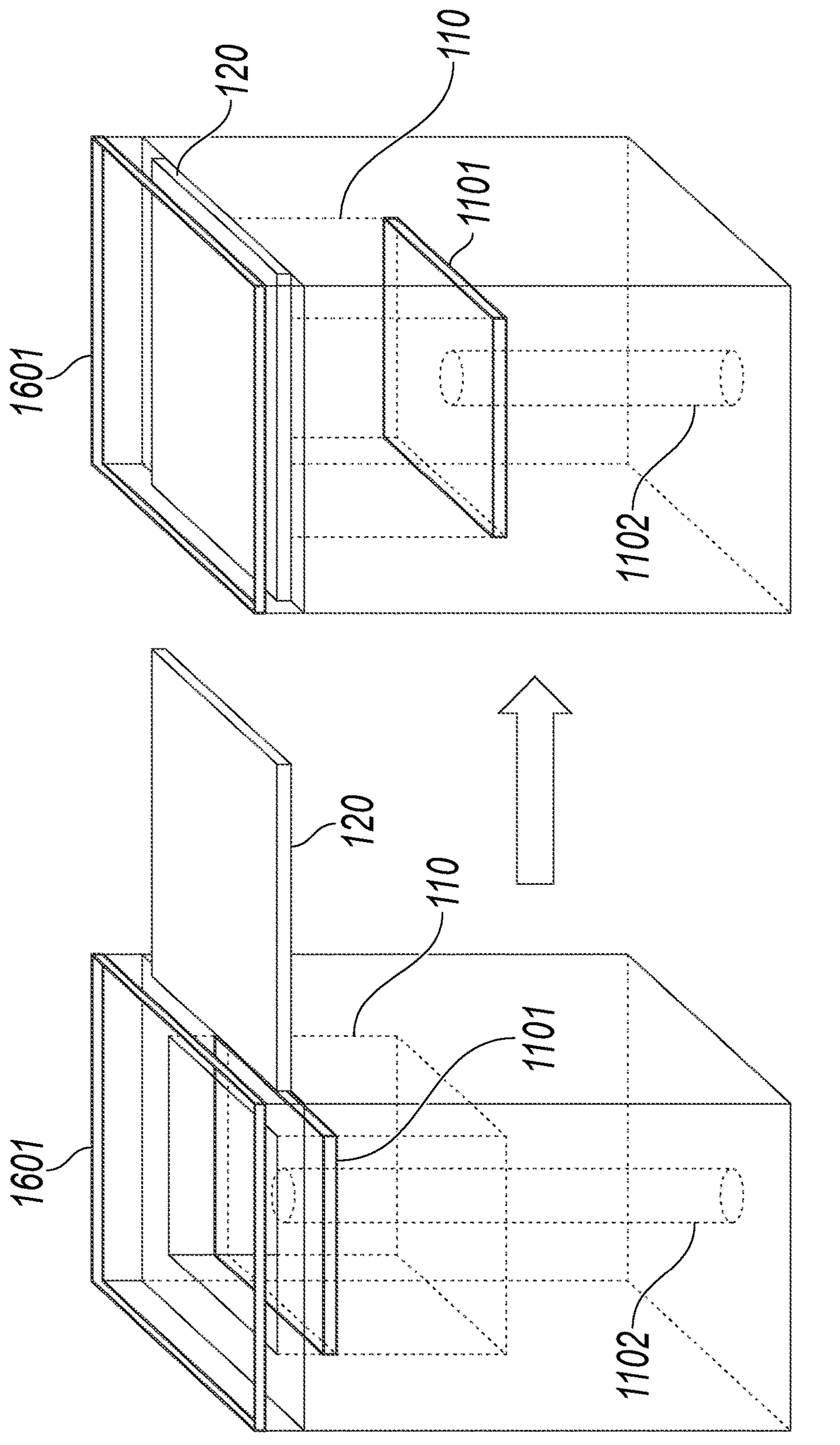
FIG. 17 is a diagram of a usage state of a self-service payment device, according to yet another implementation disclosed in the present specification.

For example, the self-service payment device can also include the first driving mechanism and the merchandise detection unit shown in FIG. 7, and the merchandise detection unit can be an infrared detection frame 1601 disposed at an opening of the payment box 110. As shown in FIG. 17, the top of the payment box 110 is open when the removable cover plate 120 is in the first state. After the controller controls the second driving mechanism 1102 to drive the lift table 1101 to move from the first height to the second height, the controller controls the removable cover plate 120 to move to the second state. As such, the payment box 110 is closed to form electromagnetic shielding space.

Assume that in a first predetermined threshold time (for example, the first predetermined threshold time can be 1 s) after the removable cover plate 120 is moved to the second state, the controller detects, by using the infrared detection frame 1601, that a merchandise is moved in the infrared detection frame 1601. In such case, the removable cover plate can be moved from the second state to the first state so that the user can put a new merchandise into the payment box 110. When the controller detects, by using the infrared detection frame 1601, that there is no new merchandise in the infrared detection frame 1601 in a second predetermined threshold time (for example, the second predetermined threshold can be 1.5 s), the controller controls the removable cover plate 120 to move to the second state again. As such, the payment box 110 is closed to form electromagnetic shielding space.

Step S1330: Control an RFID reader to read an RFID tag of a merchandise to be paid by using an RFID antenna, and obtain payment information based on a reading result.

Step S1340: Obtain payment characteristics information corresponding to the payment information of a user.

Step S1350: Determine that the removable cover plate is in a first state.

It is worthwhile to note that for descriptions of step S1330, step S1340, and step S1350, references can be made to the descriptions of step S920, step S930, and step S940 in the previous implementation. Details are omitted in the present application.

Step S1360: Control the second driving mechanism to drive the lift table from the second height to the first height.

After determining that the removable cover plate is in the first state, the controller controls the second driving mechanism to move the lift table from the second height to the first height, that is, to raise the lift table back to the first height so that the user can retrieve a merchandise.

For descriptions of the present step, references can be made to the previous descriptions of step S1310 except that the moving direction in the present step is opposite to that of step S1310.

It is worthwhile to note that, in the plurality of implementations disclosed in the present specification, the second height can be a predetermined fixed value, or can be determined based on an operation instruction entered by the user to control vertical movement of the lift table.

Alternatively, the second height can be determined based on a detection result of the infrared detection frame. For example, as shown in FIG. 15, the infrared detection frame is disposed on a periphery of the opening of the payment box. In a process that the second driving mechanism 1102 is controlled to drive the lift table 1101 to fall vertically, when the controller controls the infrared detection frame 1601 to detect that no merchandise to be paid exists in the infrared detection frame 1601, that is, it is detected that the top of the merchandise has been lowered below a detection plane of the infrared detection frame 1601, the lift table 1101 continues to be controlled to fall to a predetermined height and then stops moving. For another example, the infrared detection frame is disposed at the opening of the payment box. In a process that the second driving mechanism 1102 is controlled to drive the lift table 1101 to fall vertically, when the controller controls the infrared detection frame 1601 to detect that no merchandise to be paid exists in the infrared detection frame 1601, that is, it is detected that the top of the merchandise has been lowered below a detection plane of the infrared detection frame 1601, the lift table 1101 is controlled to stop moving.

The self-service payment method is provided in the plurality of implementations disclosed in the present specification. After it is determined that the removable cover plate is in the second state, that is, it is determined that the removable cover plate and the payment box form electromagnetic shielding space, the RFID reader completely, quickly, and accurately reads the RFID tag of the merchandise to be paid in the payment box by using the RFID antenna, and the payment information is provided based on the reading result. Further, the lift table is disposed on the bottom of the payment box, and the controller controls rise and fall of the lift table in the payment box. As such, the user can conveniently pick and place selected merchandise to further improve user experience.

Figure 18:
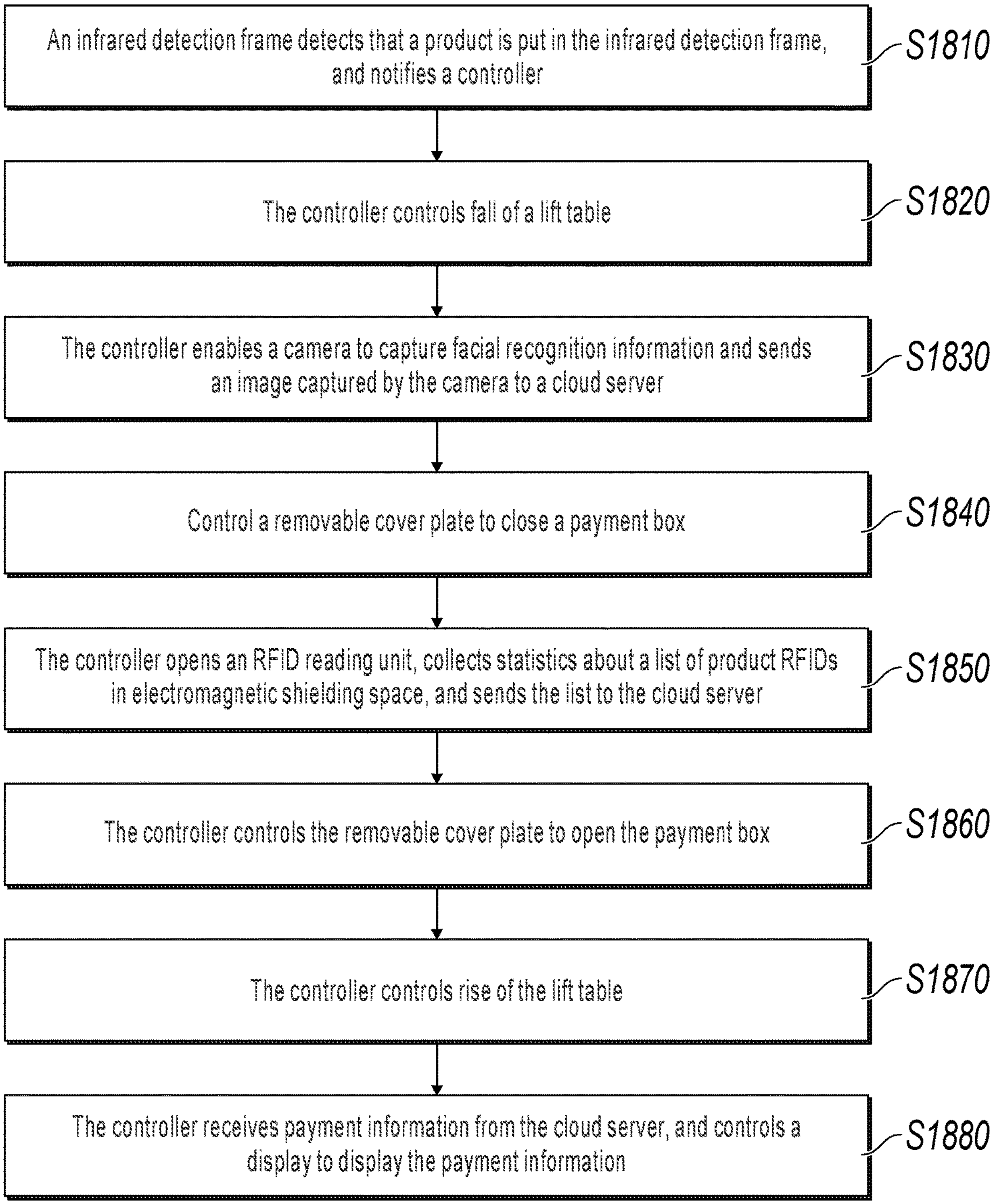
FIG. 18 is a flowchart of a self-service payment method, according to an implementation disclosed in the present specification.

FIG. 18 is a flowchart of a self-service payment method, according to an implementation disclosed in the present specification. The self-service payment method in FIG. 18 can be applied to the self-service payment device provided in the previous implementation. The device can include the payment box 110 configured to accommodate a merchandise to be paid and the removable cover plate 120 disposed on the payment box 110 shown in FIG. 5*a*, and the controller 130, the RFID reading unit 140, the first driving mechanism 1201, the input unit 150, the merchandise detection unit 160, the camera 170, and the display 180 shown in FIG. 7.

In the present implementation, a lift table 1101 is disposed on the bottom of the payment box 110. The device further includes a second driving mechanism 1102, and the controller 130 is configured to control the second driving mechanism 1102 to drive the lift table 1101 to move vertically in the payment box 110. The merchandise detection unit 160 can be an infrared detection frame.

Figure 19:
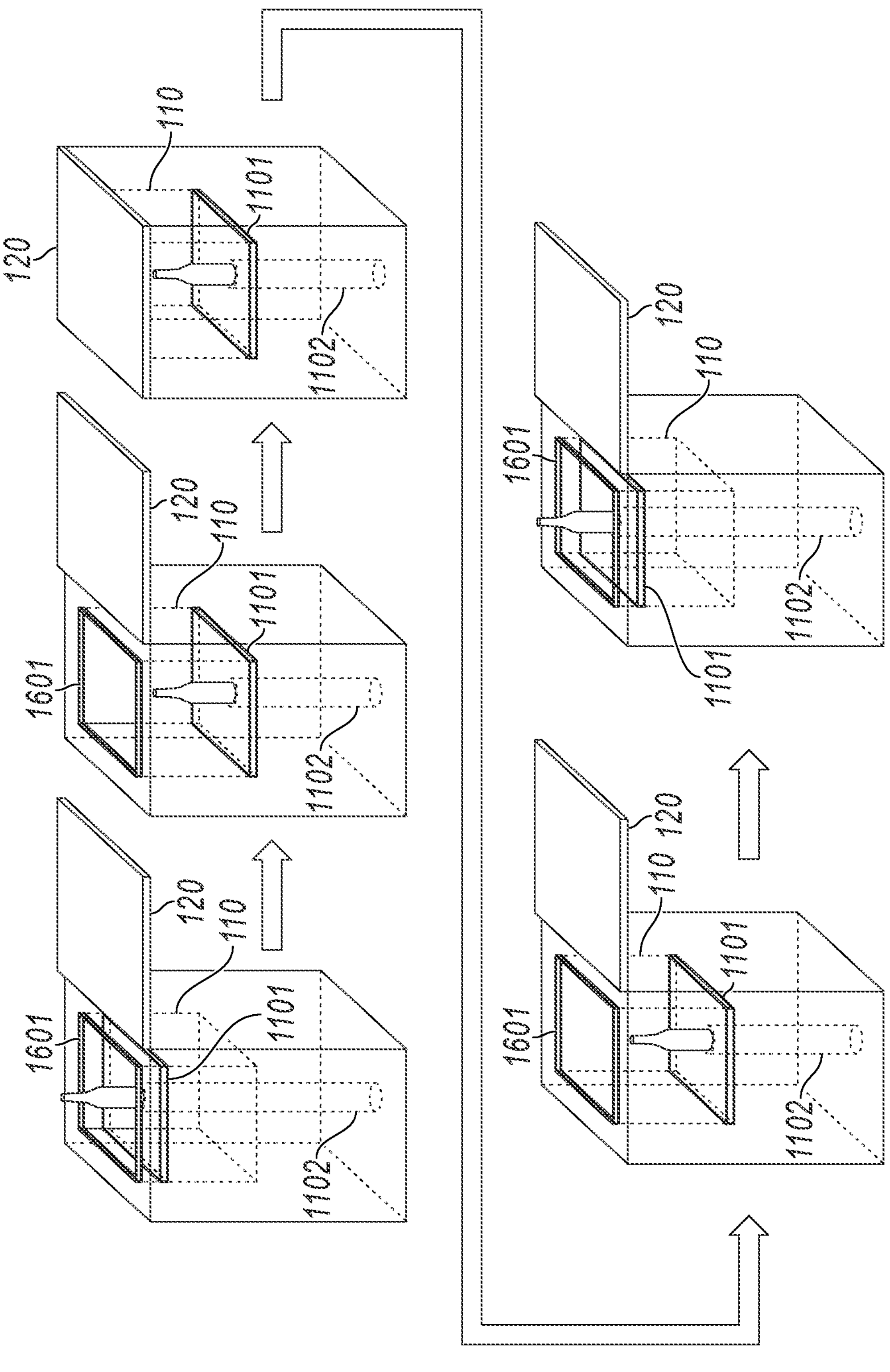
FIG. 19 is a diagram of a usage state of a self-service payment device, according to an implementation disclosed in the present specification.

The following describes the method shown in FIG. 18 with reference to FIG. 19. As shown in FIG. 18, the method includes the following steps.

Step S1810: A user places a merchandise to be paid on the lift table, and the infrared detection frame detects that a merchandise is put in the infrared detection frame and does not change in a threshold time, and notifies the controller.

The controller can be a Windows Personal Computer (PC).

As shown in FIG. 19, the infrared detection frame 1601 is disposed at an opening of the payment box 110, and the infrared detection frame 1601 is located above the lift table 1102. When the present step is performed, the top of the payment box 110 is open when the removable cover plate 120 is in a first state.

Step S1820: The controller controls fall of the lift table.

As shown in FIG. 19, the controller controls the second driving mechanism 1102 to drive the lift table 1101 to fall vertically from a first height to a second height.

Step S1830: The controller enables the camera to capture facial recognition information and sends an image captured by the camera to a cloud server.

The present step can further include the following: controlling, by the controller, a display to display the image captured by the camera so that a user can correspondingly adjust a position of the user in the camera to provide effective facial recognition information.

Step S1830 can be performed before, when, or after step S1820 is performed, and implementations are not limited in the present application.

Step S1840: The controller detects that the top of the merchandise has been completely lowered below a horizontal plane of the infrared detection frame, and controls the removable cover plate to close the payment box.

As shown in FIG. 19, the controller detects that the top of the merchandise has been completely lowered below a horizontal plane of the infrared detection frame 1601. The controller controls the first driving mechanism to drive the removable cover plate 120 to the second state. As such, the removable cover plate 120 closes so that electromagnetic shielding space is formed in the payment box 110.

Step S1850: The controller opens the RFID reading unit, collects statistics about a list of merchandise RFIDs in electromagnetic shielding space, and sends the list to the cloud server.

Step S1860: The controller controls the removable cover plate to open the payment box.

As shown in FIG. 19, the controller controls the first driving mechanism to move the removable cover plate 120 from the second state to the first state, so that the top of the payment box 110 is open.

Step S1870: The controller controls rise of the lift table.

As shown in FIG. 19, the controller controls the second driving mechanism 1102 to drive the lift table 1101 to rise vertically from the second height to the first height.

Step S1880: The controller receives payment information from the cloud server, and controls the display to display the payment information to be confirmed by the user.

It is worthwhile to note that step S1880 can be performed before, when, or after step S1860 is performed. After the user confirms the payment information, the payment is completed, and a merchandise on the lift table can be retrieved.

The self-service payment method is provided in the plurality of implementations disclosed in the present specification. The infrared detection frame detects a merchandise put on the lift table by the user. Fall of the lift table is controlled accordingly, and the removable cover plate is controlled to close the payment box to form electromagnetic shielding space, so the controller can control the RFID reader to completely, quickly, and accurately read the RFID tag of the merchandise to be paid in the payment box by using the RFID antenna and provide the payment information based on the reading result. Further, the controller controls the camera to capture the facial recognition information of the user so that the user can conveniently, quickly, and safely complete payment of selected merchandise through facial recognition payment, thereby improving user experience.

A person skilled in the art should be aware that, in the previous one or more examples, functions described in the plurality of implementations disclosed in the present specification can be implemented in hardware, software, firmware, or any combination thereof. When the functions are implemented in software, these functions can be stored in a computer-readable medium or transmitted as one or more instructions or code on a computer-readable medium.

The previous specific implementations further describe in detail the objectives, technical solutions, and beneficial effects of the plurality of implementations disclosed in the present specification. It should be understood that the previous descriptions are merely specific implementations disclosed in the present specification, and are not intended to limit the protection scope of the plurality of implementations disclosed in the present specification. Any modifications, equivalent replacements, improvements, etc. made on the basis of the technical solutions of the plurality of implementations disclosed in the present specification shall fall within the protection scope of the plurality of implementations disclosed in the present specification.

Figure 20:
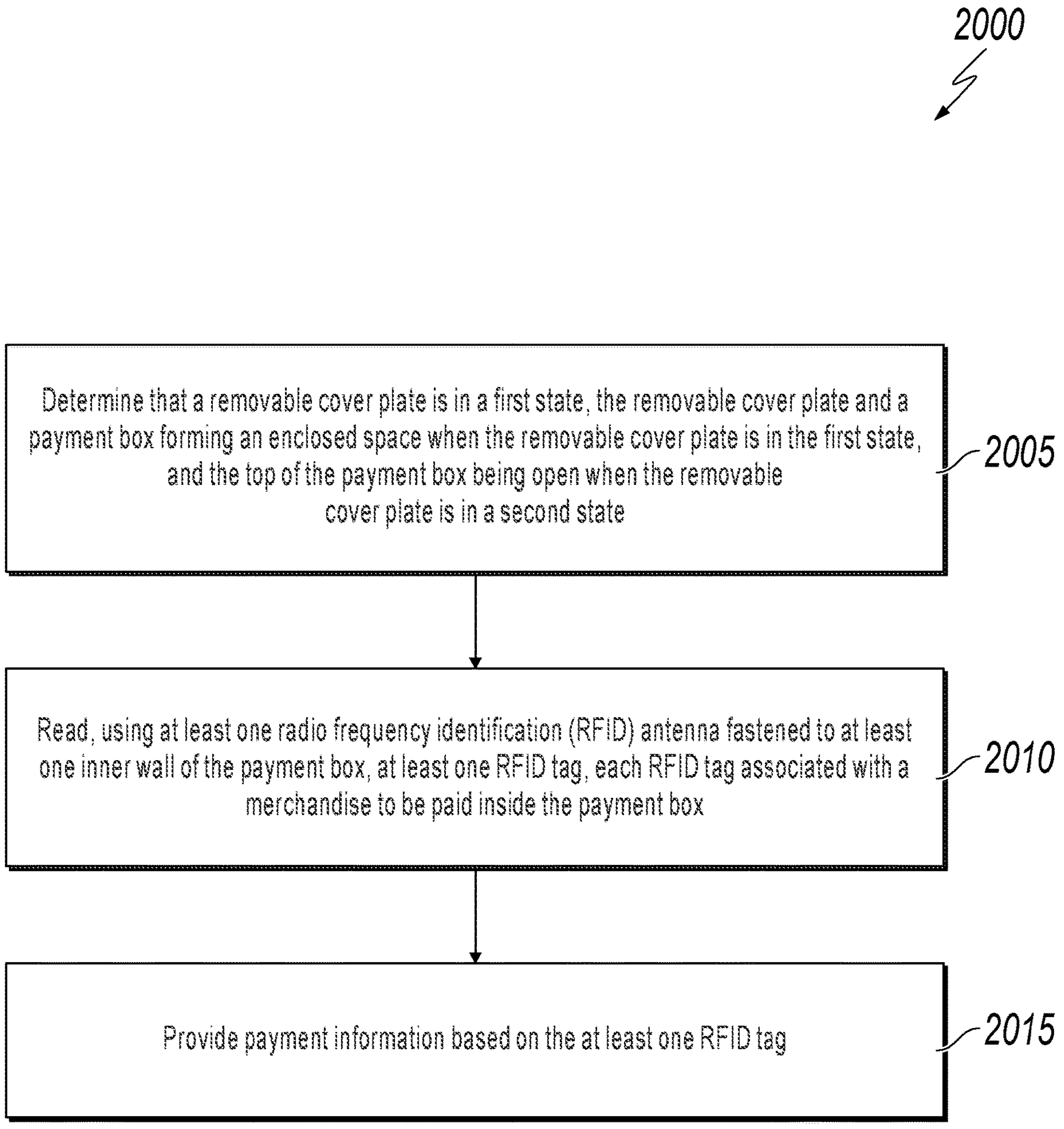
FIG. 20 is a flowchart illustrating an example of a computer-implemented method for self-service payment, according to an implementation of the present disclosure.

FIG. 20 is a flowchart illustrating an example of a computer-implemented method 2000 for self-service payment, according to an implementation of the present disclosure. For clarity of presentation, the description that follows generally describes method 2000 in the context of the other figures in this description. However, it will be understood that method 2000 can be performed, for example, by any system, environment, software, and hardware, or a combination of systems, environments, software, and hardware, as appropriate. In some implementations, various steps of method 2000 can be run in parallel, in combination, in loops, or in any order.

At 2005, a determination is made that a removable cover plate is in a first state. When in the first state, the removable cover plate and a payment box can form an enclosed space. In some cases, the enclosed space is an electromagnetic shielding space. For example, the removable cover plate and the payment box can be made of metal. When the removable cover plate is in the first state, the payment box is closed to form an electromagnetic shielding space. In some implementations, the removable cover plate can be in a second state different from the first state. When the removable cover plate is in the second state, the top of the payment box is open, and the removable cover plate and the payment box cannot form an enclosed space. When the removable cover plate is in the second state, a user can place a merchandise to be paid in the payment box. The user is outside the payment box. The payment box can be associated with a self-service payment device. In some implementations, the removable cover plate can be manually, automatically, or both manually and automatically moved between the first and second states. For example, when a user manually operates the removable cover plate, a light sensor can be used to detect light intensity in the payment box, to determine that the removable cover plate is in the first state (that is, the payment box is closed). In some cases, a locking state of a locking mechanism between the removable cover plate and the payment box can be used to determine that the removable cover plate is in the first state.

In some implementations, a lift table is located inside the payment box. The lift table can be controlled to move vertically in the payment box. The lift table can be moved using, for example, a hydraulic system, an electric motor, a screw lever, or a linear bearing. In some implementations, before determining that the removable cover plate is in the first state, the lift table can be controlled to move in the payment box from a first position to a second position. The first position is higher than the second position. In some cases, the removable cover plate, the lift table, or both the removable cover plate and the lift table can be controlled by an operation instruction entered by a user. For example, the operation instruction entered by the user can be an instruction to open the removable cover plate, close the removable cover plate, raise the lift table, or lower the lift table.

In some implementations, before determining that the removable cover plate is in the first state, a detection is made that at least one merchandise to be paid is placed inside the payment box. The detection can be made when the removable cover plate is in the second state. In some cases, the detection can be made by an infrared detection frame or a pressure sensor. For example, the infrared detection frame can be located near the top of the payment box. When a merchandise is put in or taken out of the payment box, the infrared detection frame can detect the action. After detecting one or more merchandises in the payment box, a determination is made as to whether no merchandise is put in or taken out of the payment box within a predetermined time period (such as, 1 second). If it is determined that no merchandise is put in or taken out of the payment box within the predetermined time period, the removable cover plate can be controlled to move to the first state. In some implementations, the infrared detection frame can be located near the bottom of the payment box, or at a location inside the payment box that is above the lift table. The pressure sensor can be located on the bottom of the payment box. In some cases, the pressure sensor can be located on the lift table. When a merchandise is put in or taken out of the payment box, the pressure sensor can detect the action by measuring the pressure change. After detecting one or more merchandises in the payment box, a determination is made as to whether a pressure change within a predetermined time period (such as, 1.5 second) is less than a pressure change threshold (such as, 0.1 N). If it is determined that the pressure change within the predetermined time period is less than the pressure change threshold, the removable cover plate can be controlled to move to the first state. From 2005, method 2000 proceeds to 2010.

At 2010, at least one radio frequency identification (RFID) tag is read using at least one RFID antenna. In some implementations, the at least one RFID antenna is fastened to at least one inner wall of the payment box. The at least one RFID antenna can be connected to an RFID reader. The RFID reader can be located outside or inside the payment box. Each RFID tag is associated with a merchandise to be paid inside the payment box. For example, an RFID tag can be attached to a merchandise, and can include information associated with the merchandise (such as, name of the merchandise, and unit price of the merchandise). In some implementations, since the removable cover plate is in the first state to form an electromagnetic shielding space with the payment box, the at least one RFID antenna can read RFID tags inside the payment box, but not RFID tags outside the payment box. From 2010, method 2000 proceeds to 2015.

At 2015, payment information is provided based on the at least one RFID tag. For example, the payment information can include at least one of names of the merchandises to be paid, number of units of the merchandises to be paid, unit prices of the merchandises to be paid, a total amount to be paid, and available payment methods (such as ALIPAY). The payment information can be displayed, for example, on a display to the user. In some cases, the payment information can be displayed as a bar code or a quick response (QR) code. In some implementations, the at least one RFID tag is sent to a local server or a cloud server to obtain the payment information associated with the at least one RFID tag. In some implementations, the user can log in to an application (such as, an ALIPAY application) using a mobile device, enter a number (or scan a bar code or a QR code) of a self-service payment device associated with the payment box, and receive the payment information. The user can make a payment (such as, a cash payment, a credit or debit card payment, and a mobile payment) based on the payment information.

In some implementations, payment associated with the payment information can be received from a user. Before receiving the payment, identification information of the user can be captured. The identification information of the user can include at least one of identity card information of the user, face information of the user, fingerprint information of the user, and QR code identification information of the user. In some cases, payment methods of the user, transaction amount, or both can be obtained by the self-service payment device. For example, a camera can be used to capture identification information of the user (such as, ID card information, iris information, and face information). The captured identification information can be sent to a server (such as, a payment server, and a cloud server). The server can determine a user account based on the captured identification information, and complete the payment based on the user account and the payment information.

In some implementations, after receiving the payment successfully, a determination is made that the removable cover plate is in the second state. For example, an operation instruction is received from the user to move the removable cover plate from the first state to the second state. In some cases, after the removable cover plate is moved to the second state, the lift table can be controlled to move from the second position to the first position. When the removable cover plate is in the second state and the lift table is at the first position, the user can take out paid merchandises from the payment box. After 2015, method 2000 stops.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:

determining that at least one merchandise item available for sale is situated on a lift table, wherein the at least one merchandise item does not change for a predetermined time period, each merchandise item of the at least one merchandise item is associated with a radio frequency identification (RFID) tag, and the lift table is located inside a payment box;

controlling the lift table to move from a first position to a second position, wherein the first position is higher than the second position;

while the lift table is at the second position, determining that a removable cover plate is in a first state, wherein the removable cover plate and the payment box form an enclosed space when the removable cover plate is in the first state, the at least one merchandise item is located in the enclosed space, and a top of the payment box is open when the removable cover plate is in a second state;

reading, using at least one RFID antenna fastened to at least one inner wall of the payment box, at least one RFID tag associated with the at least one merchandise item; and providing payment information based on the at least one RFID tag.

2. The computer-implemented method of claim 1, wherein the enclosed space is an electromagnetic shielding space.

3. The computer-implemented method of claim 1, further comprising:

receiving, from a user, payment associated with the payment information; and determining that the removable cover plate is in the second state.

4. The computer-implemented method of claim 3, wherein receiving, from the user, the payment associated with the payment information comprises:

capturing identification information of the user, wherein the identification information of the user includes at least one of identity card information of the user, face information of the user, fingerprint information of the user, and quick response (QR) code identification information of the user; and transmitting the identification information of the user to a payment server.

5. The computer-implemented method of claim 3, wherein determining that the removable cover plate is in the second state comprises:

receiving an instruction from the user; and controlling the removable cover plate to move from the first state to the second state based on the instruction.

6. The computer-implemented method of claim 3, wherein after determining that the removable cover plate is in the second state, the method further comprises:

controlling the lift table to move from the second position to the first position.

7. The computer-implemented method of claim 1, wherein determining that the at least one merchandise item available for sale is situated on the lift table comprises:

detecting that the at least one merchandise item is placed inside the payment box when the removable cover plate is in the second state;

determining that the at least one merchandise item inside the payment box does not change for the predetermined time period; and controlling the removable cover plate to move from the second state to the first state.

8. The computer-implemented method of claim 7, wherein the detecting is performed by an infrared detection frame or a pressure sensor, the infrared detection frame is located near the top of the payment box, and the pressure sensor is located on a bottom of the payment box.

9. A non-transitory computer-readable storage medium coupled to one or more computers and configured with instructions executable by the one or more computers to:

determine that at least one merchandise item available for sale is situated on a lift table, wherein the at least one merchandise item does not change for a predetermined time period, each merchandise item of the at least one merchandise item is associated with a radio frequency identification (RFID) tag, and the lift table is located inside a payment box;

control the lift table to move from a first position to a second position, wherein the first position is higher than the second position;

while the lift table is at the second position, determine that a removable cover plate is in a first state, wherein the removable cover plate and the payment box form an enclosed space when the removable cover plate is in the first state, the at least one merchandise item is located in the enclosed space, and a top of the payment box is open when the removable cover plate is in a second state;

read, using at least one RFID antenna fastened to at least one inner wall of the payment box, at least one RFID tag associated with the at least one merchandise item; and provide payment information based on the at least one RFID tag.

10. The non-transitory computer-readable storage medium of claim 9, wherein the enclosed space is an electromagnetic shielding space.

11. The non-transitory computer-readable storage medium of claim 9, further configured with instructions executable by the one or more computers to:

receive, from a user, payment associated with the payment information; and determine that the removable cover plate is in the second state.

12. The non-transitory computer-readable storage medium of claim 11, wherein receiving the payment associated with the payment information includes:

capturing identification information of the user, wherein the identification information of the user includes at least one of identity card information of the user, face information of the user, fingerprint information of the user, and quick response (QR) code identification information of the user; and transmitting the identification information of the user to a payment server.

13. The non-transitory computer-readable storage medium of claim 11, wherein determining that the removable cover plate is in the second state comprises:

receiving an instruction from the user; and controlling the removable cover plate to move from the first state to the second state based on the instruction.

14. The non-transitory computer-readable storage medium of claim 11, wherein after determining that the removable cover plate is in the second state, the non-transitory computer-readable storage medium is further configured with instructions executable by the one or more computers to:

control the lift table to move from the second position to the first position.

15. The non-transitory computer-readable storage medium of claim 9, wherein determining that the at least one merchandise item available for sale is situated on the lift table comprises:

detecting that the at least one merchandise item is placed inside the payment box when the removable cover plate is in the second state;

determining that the at least one merchandise item inside the payment box does not change for the predetermined time period; and controlling the removable cover plate to move from the second state to the first state.

16. The non-transitory computer-readable storage medium of claim 15, wherein the detecting is performed by an infrared detection frame or a pressure sensor, the infrared detection frame is located near the top of the payment box, and the pressure sensor is located on a bottom of the payment box.

17. A system, comprising:

one or more computers; and one or more computer-readable memories coupled to the one or more computers and configured with instructions executable by the one or more computers to:

determine that at least one merchandise item available for sale is situated on a lift table, wherein the at least one merchandise item does not change for a predetermined time period, each merchandise item of the at least one merchandise item is associated with a radio frequency identification (RFID) tag, and the lift table is located inside a payment box;

control the lift table to move from a first position to a second position, wherein the first position is higher than the second position;

while the lift table is at the second position, determine that a removable cover plate is in a first state, wherein the removable cover plate and the payment box form an enclosed space when the removable cover plate is in the first state, the at least one merchandise item is located in the enclosed space, and a top of the payment box is open when the removable cover plate is in a second state;

read, using at least one RFID antenna fastened to at least one inner wall of the payment box, at least one RFID tag associated with the at least one merchandise item; and provide payment information based on the at least one RFID tag.

18. The system of claim 17, wherein the enclosed space is an electromagnetic shielding space.

* * * * *